(12) United States Patent
Iyoda et al.

(10) Patent No.: US 8,476,322 B2
(45) Date of Patent: Jul. 2, 2013

(54) MICROPHASE-SEPARATED STRUCTURE MEMBRANE AND PROCESS FOR PRODUCING THE SAME

(75) Inventors: Tomokazu Iyoda, Yokohama (JP); Sadayuki Asaoka, Yokohama (JP); Yukimitsu Suzuki, Yokohama (JP); Haruyuki Nakanishi, Susono (JP); Shinichi Matsumoto, Fuji (JP); Hidekazu Arikawa, Susono (JP)

(73) Assignees: Tokyo Institute of Technology, Tokyo (JP); Toyota Jidosha Kabushiki Kaisha, Toyota-shi, Aichi (JP)

( * ) Notice: Subject to any disclaimer, the term of this patent is extended or adjusted under 35 U.S.C. 154(b) by 457 days.

(21) Appl. No.: 12/675,955

(22) PCT Filed: Sep. 2, 2008

(86) PCT No.: PCT/JP2008/066142
§ 371 (c)(1),
(2), (4) Date: Mar. 3, 2010

(87) PCT Pub. No.: WO2009/031676
PCT Pub. Date: Mar. 12, 2009

(65) Prior Publication Data
US 2010/0210742 A1 Aug. 19, 2010

(30) Foreign Application Priority Data
Sep. 3, 2007 (JP) .................. 2007-227972

(51) Int. Cl.
*C08J 5/20* (2006.01)
(52) U.S. Cl.
USPC .............................. 521/27; 428/159; 216/56

(58) Field of Classification Search
USPC .............................. 521/27; 428/159; 216/56
See application file for complete search history.

(56) References Cited

U.S. PATENT DOCUMENTS

| | | | |
|---|---|---|---|
| 6,565,763 B1 * | 5/2003 | Asakawa et al. | 216/56 |
| 2009/0117335 A1 * | 5/2009 | Iyoda et al. | 428/159 |

FOREIGN PATENT DOCUMENTS

| | | | |
|---|---|---|---|
| EP | 1950799 A1 * | 7/2008 | |
| EP | 2199312 A1 * | 6/2010 | |
| JP | 2002-155113 A | | 5/2002 |
| JP | 2004-124088 | * | 4/2004 |
| JP | 2004-124088 A | | 4/2004 |
| JP | 2005-29779 A | | 2/2005 |

(Continued)

OTHER PUBLICATIONS

Supplementary European Search Report dated May 18, 2011, issued in corresponding European Patent Application No. 08828950.9.

(Continued)

*Primary Examiner* — Peter D. Mulcahy
*Assistant Examiner* — Henry Hu
(74) *Attorney, Agent, or Firm* — Westerman, Hattori, Daniels & Adrian, LLP

(57) ABSTRACT

Provided is a microphase-separated structure membrane including a block copolymer in which a hydrophilic polymer component and a hydrophobic polymer component are coupled to each other via a structural unit having a reactive group, an electron acceptor or electron donor, or a dye. In the microphase-separated structure membrane, a cylinder structure composed of the hydrophilic polymer component lies in a matrix composed of the hydrophobic polymer component and is oriented in the direction perpendicular to the membrane surface, and the structural unit having a reactive group, an electron acceptor or electron donor, or a dye lies between the matrix and the cylinder structure.

6 Claims, 3 Drawing Sheets

FOREIGN PATENT DOCUMENTS

| | | | |
|---|---|---|---|
| JP | 2006-273890 | * | 10/2006 |
| JP | 2006-273890 A | | 10/2006 |
| JP | 2006-299106 A | | 11/2006 |
| JP | 2007-031573 | * | 2/2007 |
| JP | 2007-031573 A | | 2/2007 |
| JP | 2007-131653 | * | 5/2007 |
| JP | 2007-131653 A | | 5/2007 |
| WO | 01/70873 A2 | | 9/2001 |

OTHER PUBLICATIONS

Chinese Office Action dated Oct. 26, 2011, issued in corresponding Chinese Patent Application No. 200880113781.8.

Notification of Transmittal of Translation of the International Preliminary Report on Patentability (Form PCT/IB/338) with mailing date of May 20, 2010 for corresponding International Patent Application No. PCT/JP2008/066142, mailed with Form PCT/IPEA/409.

Kenji Kishimoto et al. "Nanostructed Anistropic Ion-Conductive Films," JACS, Feb. 22, 2003, pp. 3196-3197, vol. 125, No. 11.

Masafumi Yoshio et al. "One-Dimensional Ion Transport in Self-Organized Columnar Ionic Liquids," JACS, Jan. 9, 2004, pp. 994-995, vol. 126, No. 4.

Adam Z. Weber et al. "Transport in Polymer-Electrolyte Membranes," Journal of the Electrochemical Society, 2003, pp. A1008-A1015, vol. 150 (7).

International Search Report of PCT/JP2008/066142, mailing date of Dec. 16, 2008.

Chinese Office Action dated Aug. 17, 2012, issued in corresponding Chinese Patent application No. 200880113781.8.

* cited by examiner

MICROPHASE-SEPARATED STRUCTURE MEMBRANE AND PROCESS FOR PRODUCING THE SAME

TECHNICAL FIELD

The present invention relates to a microphase-separated structure membrane and a method for producing the membrane, and further specifically relates to a microphase-separated structure membrane that can be used as an anisotropic ion-conductive material and a method for producing the membrane. The microphase-separated structure membrane of the present invention can be used as, for example, a photoelectronic functional polymer material, an energy-related material, a surface-modified material, a high-density recording material such as a patterned medium, or a nanofilter. In addition, the present invention relates to a Porous structure and a method for producing the structure. The porous structure of the present invention can be used as an anisotropic ion-conductive material such as a fuel cell polymer electrolyte, an ion-exchanging resin, a microreactor thin membrane, a protein-separating membrane, an organic zeolite, or a high orientation template for various pillars.

BACKGROUND ART

In recent years, it has been tried to provide a new function by accumulating and orienting organic molecules. For example, a block copolymer, in which two or more types of polymers that are incompatible to each other are chemically coupled to each other at their ends, forms a stable microphase-separated structure in its ordered state. In the growth of a microphase-separated structure of a polymer, generally, the structure can grow to some extent by heating the polymer at a temperature that does not destroy the structure of the polymer as a whole. In this method, the domains of microphase-separated structures randomly formed in the polymer serve as cores, and the growth reflecting the respective structures randomly develops. Therefore, in usual, a multi-domain structure in which the microphase-separated structures of each domain are randomly oriented is given. In addition, in the phase-separated structure of a bulk material, a multi-domain structure in which individual domains are disorderly oriented is given. In order to control the orientation of phase-separated structures, as in core generation and growth in a crystallization process, it is necessary to make the phase-separated structures occur at the interface of a membrane and grow inside the membrane while maintaining the orientation.

In order to achieve the above-mentioned object, the present inventors have developed a block copolymer in which a hydrophilic polymer chain and a hydrophobic polymer chain are coupled to each other and developed a microphase-separated structure membrane in which the block copolymer is oriented in the same direction (Patent Document 1). Furthermore, the present inventors have developed a similar microphase-separated structure membrane by using a chalcone analog (Patent Document 2).

On the other hand, in the field of ionics, liquid electrolytes are widely used, and it is the current state that there are still many problems to be solved for providing a wholly solidified element. As already developed solid fuel cells employing ion conductive materials, for example, known are solid oxide fuel cells employing oxides or sulfides of, for example, zirconium, yttrium, bismuth, or vanadium, solid fuel cells employing fused carbonates or phosphoric acid, and solid fuel cells employing fluorine-based polymer electrolyte membranes represented by, for example, Nafion (registered trade mark) and Dow (registered trade mark). Layered porous membranes of polyethylene or polypropylene, polyolefin-based resins, and the like can be thinned and have high porosity and are, from these characteristics, applied to practical use as lithium ion conductive solid electrolytes.

In order to inexpensively produce such an ion conductor at a large scale, microporous structures are required to be reduced in sizes and to be controlled in pore shapes and orientation in the membrane, but the actual state is that these requirements have been still insufficiently achieved.

Furthermore, organic compounds and polymer materials that can be designed to materials having both a soft segment that can accelerate ion movement and a hard segment that can maintain the shape of a solid are being paid attention. Ion conductive mechanisms that utilize a net-like structure of a cross-linked polymer gel, a blend of different polymers, an ionic liquid, or a layer-like structure formed in a membrane surface by, for example, a liquid crystal have been developed. However, it is difficult to control the orientation because of the chemical structures of the materials used, and thereby ion transport anisotropy against an electrode substrate cannot be exhibited (Non-Patent Documents 1 to 3).

[Patent Document 1] Japanese Unexamined Patent Application Publication No. 2004-124088

[Patent Document 2] Japanese Unexamined Patent Application Publication No. 2007-131653

[Non-Patent Document 1] T. Kato, et al., JACS, 126, 994 (2004)

[Non-Patent Document 2] Adam. Z. Weber, et al., J. Electrochem. Soc., 150 (7) A1008 (2003)

[Non-Patent Document 3] T. Kato, et al., JACS, 125, 3196 (2003)

It is an object of the present invention to provide a microphase-separated structure membrane in which an oriented micro-patterned membrane of a polymer thin film showing phase separation in a nanometer region is used, as described in Patent Document 1. The microphase-separated structure membrane has material diffusion characteristics that depend on the orientation of the phase-separated structure in the membrane and can be used as, for example, a photoelectronic functional polymer material, an energy-related material, a surface-modified material, a high-density recording material such as a patterned medium, or a nanofilter. Furthermore, it is an object of the present invention to provide a porous structure that can be used as an anisotropic ion-conductive material such as a fuel cell polymer electrolyte, an ion-exchanging resin, a microreactor thin membrane, a protein-separating membrane, an organic zeolite, or a high orientation template for various pillars.

DISCLOSURE OF INVENTION

The present inventors have conducted intensive studies for solving the above-mentioned problems and, as a result, have obtained a finding that the above-mentioned objects can be achieved by using a block copolymer having a specific structure.

The present invention has been accomplished on the basis of the above finding and provides a microphase-separated structure membrane containing a block copolymer in which a hydrophilic polymer component and a hydrophobic polymer component are coupled to each other via a structural unit having a reactive group, an electron acceptor or electron donor, or a dye. In the microphase-separated structure membrane, a cylinder structure composed of the hydrophilic polymer component lies in a matrix composed of the hydrophobic polymer component and is oriented in the direction perpendicular to the membrane surface, and the structural unit having a reactive group, an electron acceptor or electron donor, or a dye lies between the matrix and the cylinder structure.

Examples of the hydrophilic polymer component of the block copolymer include poly(ethylene oxide), poly(propylene oxide), poly(vinyl alcohol), poly(acrylic acid), poly(methacrylic acid), poly(acrylamide), poly(acrylate) having a hydrophilic side chain, and poly(methacrylate) having a hydrophilic side chain. Examples of the hydrophobic polymer component include poly(acrylate) or poly(methacrylate) having a mesogenic side chain, a long alkyl side chain, or a hydrophobic side chain, poly(styrene), and vinyl polymers.

The molecular weight distribution (Mw/Mn) of the copolymer is preferably 1.4 or less.

Examples of the copolymer include those represented by the following formula:

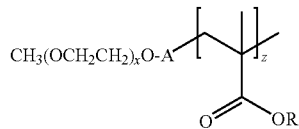

(1)

(in the formula, x and z may be the same or different and each represent an integer of 5 to 500; A represents a structural unit having a reactive group, an electron acceptor or electron donor, or a dye; and R is a substituent represented by the following formula (2), (3), or (4):

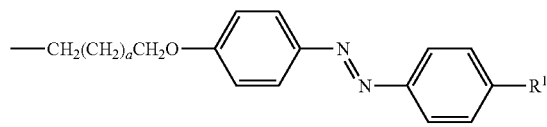

(2)

(in the formula, a is an integer of 0 to 20; and $R^1$ is a hydrogen atom or an alkyl group having 1 to 22 carbon atoms),

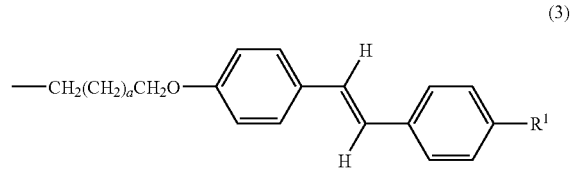

(3)

(in the formula, a is an integer of 0 to 20; and $R^1$ is a hydrogen atom or an alkyl group having 1 to 22 carbon atoms),

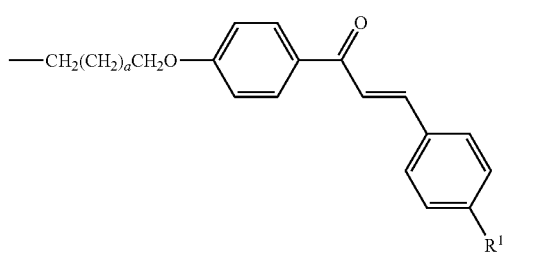

(4)

(in the formula, a is an integer of 0 to 20; and $R^1$ is a hydrogen atom or an alkyl group having 1 to 22 carbon atoms)).

Examples of the structural unit having a reactive group, an electron acceptor or electron donor, or a dye include those represented by any of the following formulae (5) to (32):

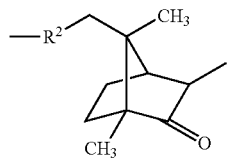

(5)

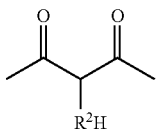

(6)

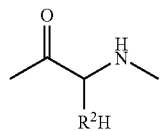

(7)

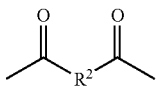

(8)

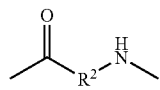

(9)

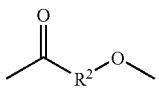

(10)

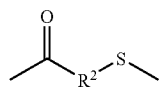

(11)

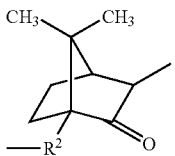

(12)

-continued
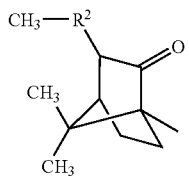 (13)
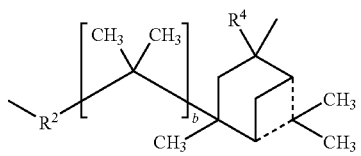 (14)
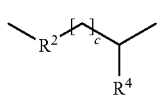 (15)
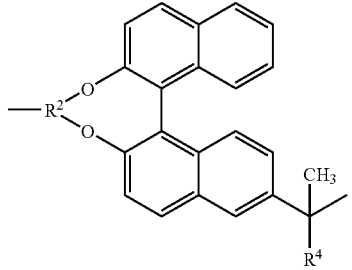 (16)
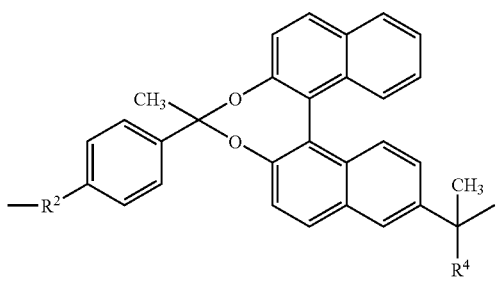 (17)
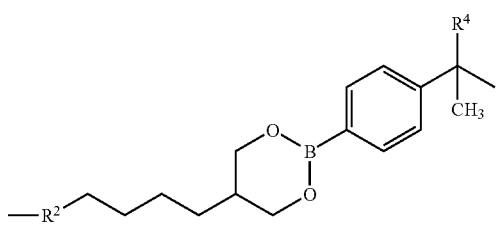 (18)
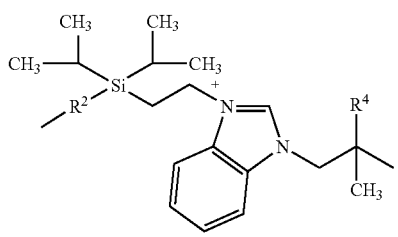 (19)
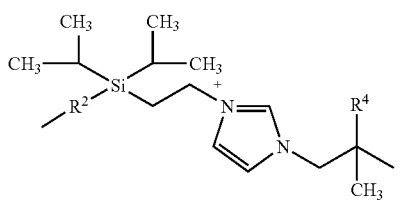 (20)
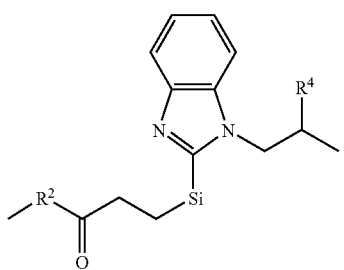 (21)
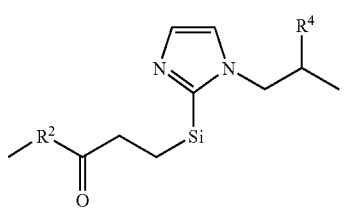 (22)
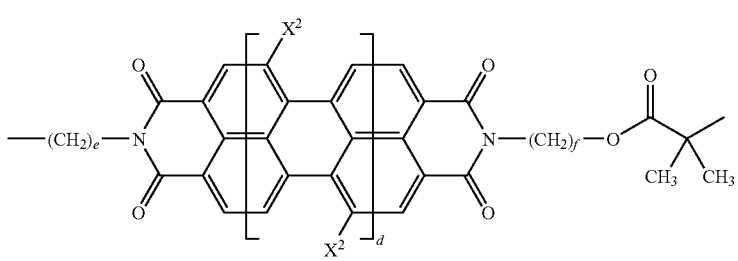 (23)

-continued
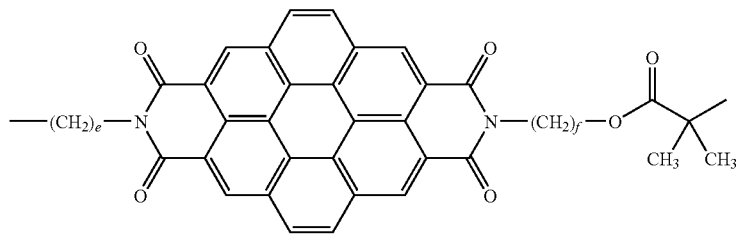
(24)
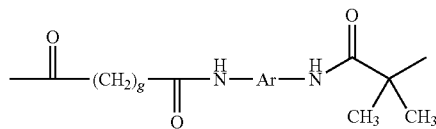
(25)
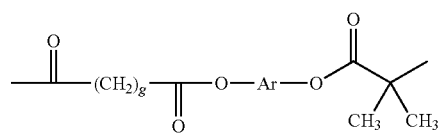
(26)
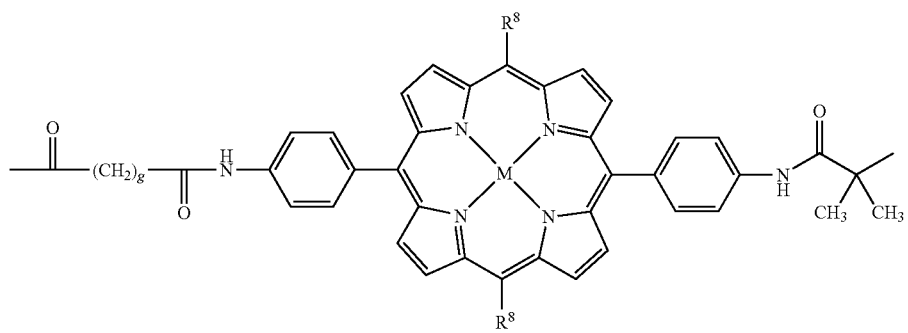
(27)
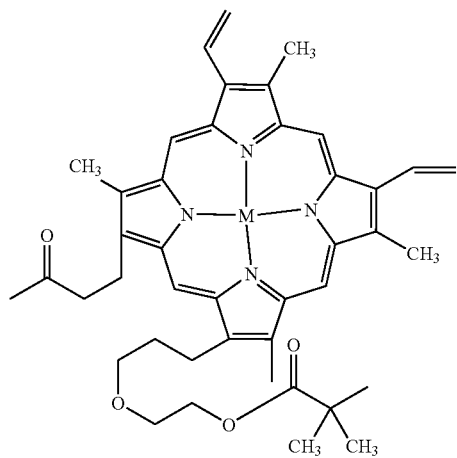
(28)
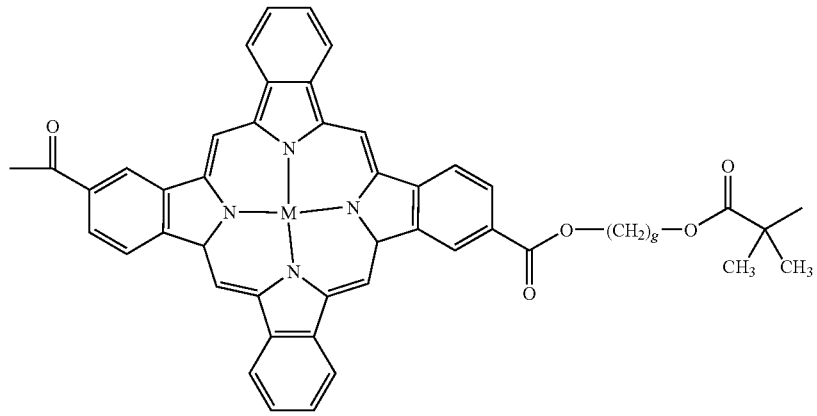
(29)

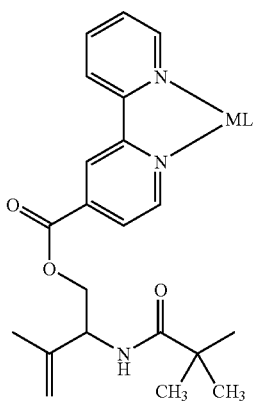

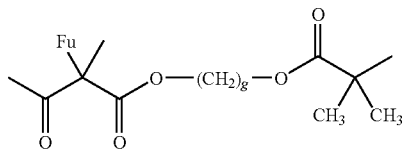

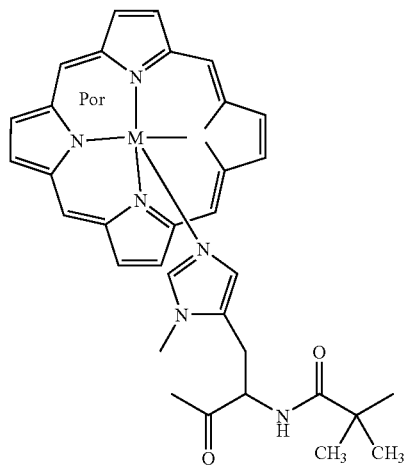

(in the formulae, $R^2$ represents a reactive group; $R^4$ represents a cyano group or a carboxylic acid ester; Fu represents a fullerene; b and c may be the same or different and each represent an integer of 0 to 4; d represents an integer of 0 to 3; e, f, and g may be the same or different and each represent an integer of 1 to 10; Ar represents an aromatic hydrocarbon composed of a plurality of aromatic rings or a quinone; $R^8$ represents hydrogen, an aromatic hydrocarbon, or a heterocycle; M represents $H_2$ or a metal ion; ML represents a transition metal complex; and Por represents a porphyrin).

Examples of the reactive group include those selected from the group consisting of the followings:

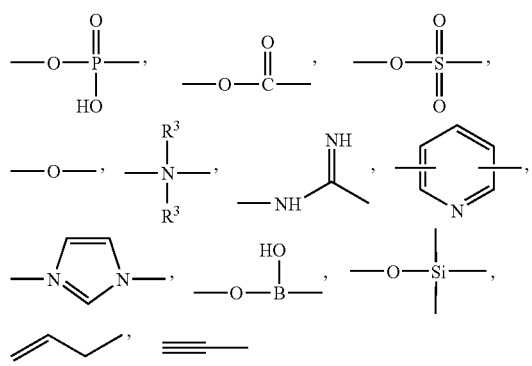

(in the formulae, $R^3$ denotes a hydrogen atom, or an alkyl group).

The cylinder structure is preferably a hexagonal close-packed cylinder structure.

The microphase-separated structure membrane may be disposed on a substrate.

Furthermore, the present invention provides a porous structure in which pores are formed by etching the cylinder structure of the microphase-separated structure membrane.

In addition, the present invention provides a method for producing the microphase-separated structure membrane. The method include the step of preparing a block copolymer solution by dissolving a block copolymer in which a hydrophilic polymer component and a hydrophobic polymer component are coupled to each other via a structural unit having a reactive group, an electron acceptor or electron donor, or a dye in a solvent that can dissolve the block copolymer; the step of applying the block copolymer solution to a substrate surface or dropwise adding the block copolymer solution into a liquid that does not dissolve the solution; and the step of forming a microphase-separated structure membrane of the block copolymer by evaporating the solvent.

Examples of the hydrophilic polymer component of the block copolymer include poly(ethylene oxide), poly(propylene oxide), poly(vinyl alcohol), poly(acrylic acid), poly(methacrylic acid), poly(acrylamide), poly(acrylate) having a hydrophilic side chain, and poly(methacrylate) having a hydrophilic side chain. Examples of the hydrophobic polymer component include poly(acrylate) or poly(methacrylate)

having a mesogenic side chain, a long alkyl side chain, or a hydrophobic side chain, poly(styrene), and vinyl polymers.

The molecular weight distribution (Mw/Mn) of the copolymer is preferably 1.4 or less.

Examples of the copolymer include those represented by the following formula:

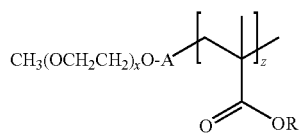

(1)

(in the formula, x and z may be the same or different and each represent an integer of 5 to 500; A represents a structural unit having a reactive group, an electron acceptor or electron donor, or a dye; and R is a substituent represented by the following formula (2), (3), or (4):

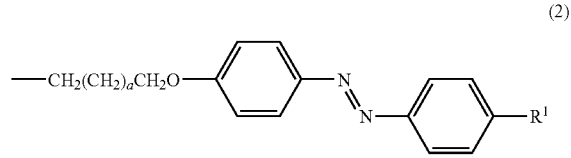

(2)

(in the formula, a is an integer of 0 to 20; and $R^1$ is a hydrogen atom or an alkyl group having 1 to 22 carbon atoms),

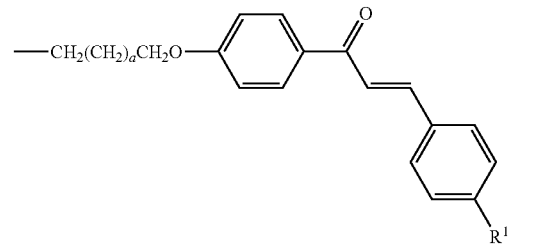

(3)

(in the formula, a is an integer of 0 to 20; and $R^1$ is a hydrogen atom or an alkyl group having 1 to 22 carbon atoms), (4)

(in the formula, a is an integer of 0 to 20; and $R^1$ is a hydrogen atom or an alkyl group having 1 to 22 carbon atoms)).

Examples of the structural unit having a reactive group, an electron acceptor or electron donor, or a dye include those represented by any of the following formulae (5) to (32):

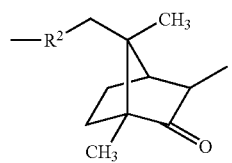

(5)

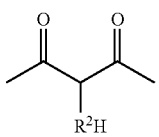

(6)

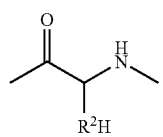

(7)

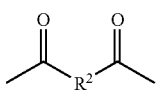

(8)

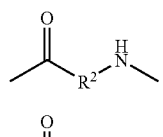

(9)

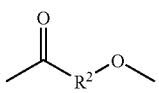

(10)

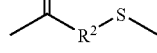

(11)

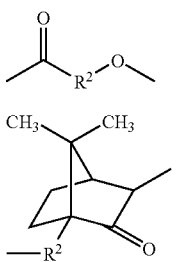

(12)

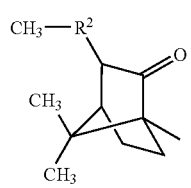

(13)

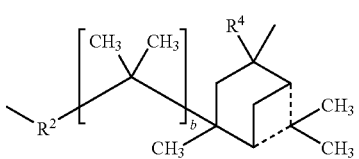

(14)

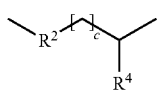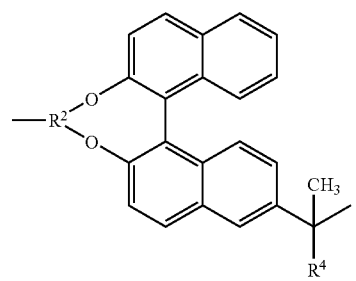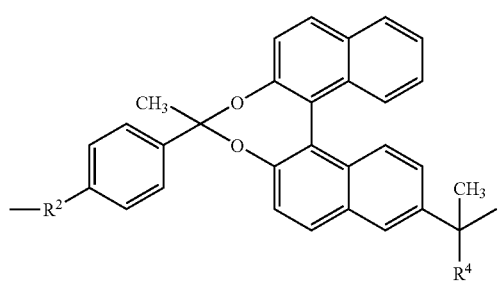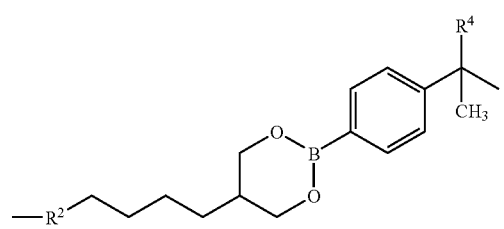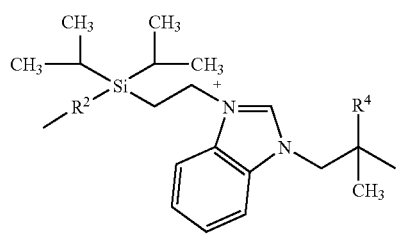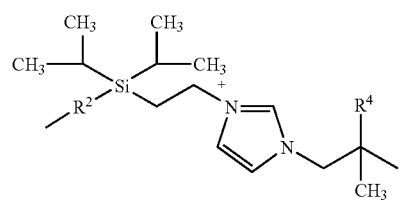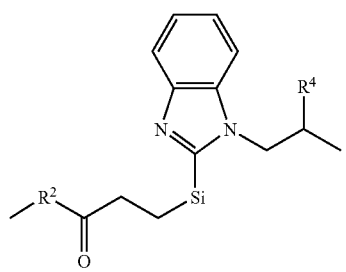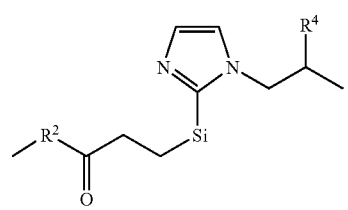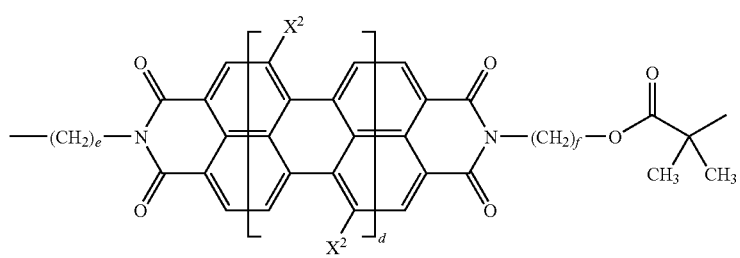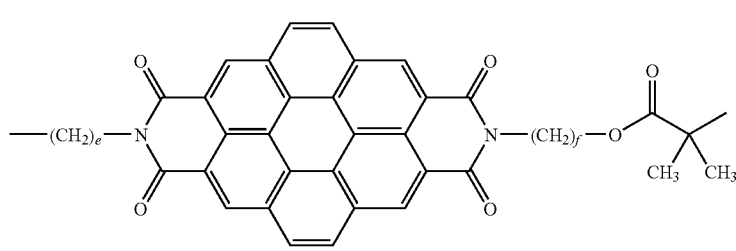

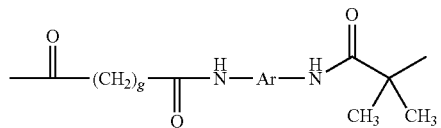
(25)
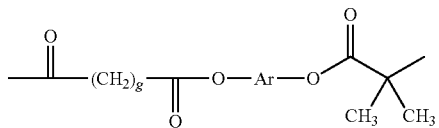
(26)
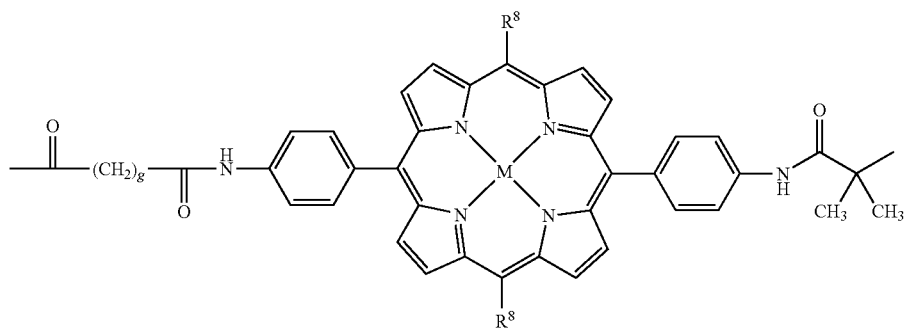
(27)
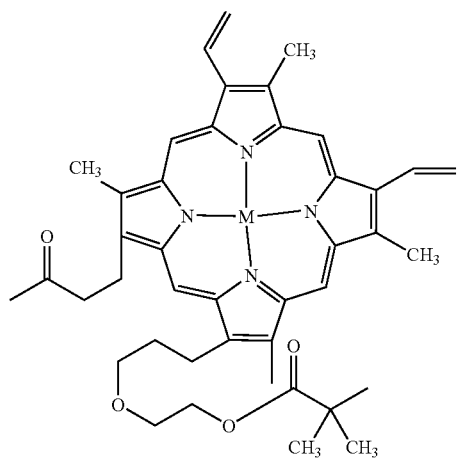
(28)
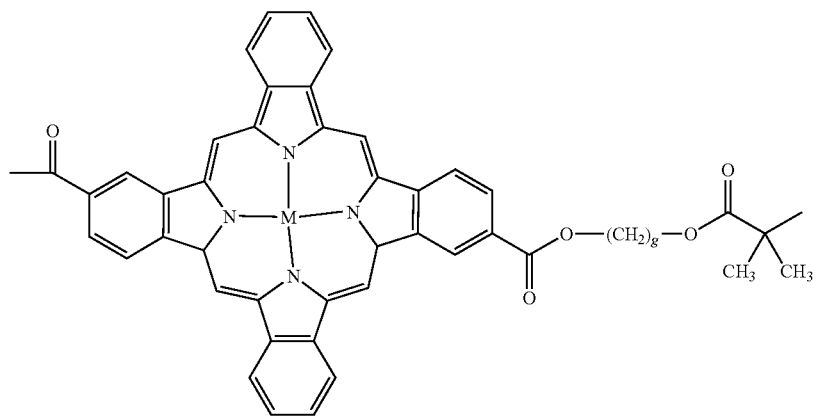
(29)

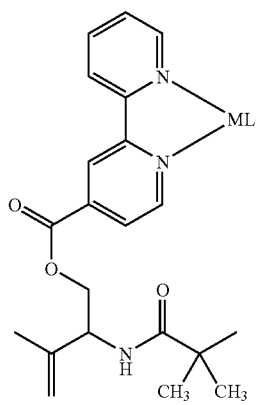
(30)

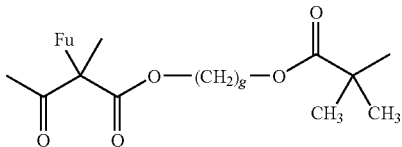
(31)

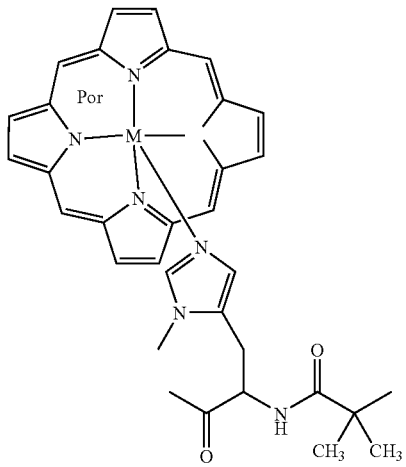

(32)

(in the formulae, $R^2$ represents a reactive group; $R^4$ represents a cyano group or a carboxylic acid ester; Fu represents a fullerene; b and c may be the same or different and each represent an integer of 0 to 4; d represents an integer of 0 to 3; e, f, and g may be the same or different and each represent an integer of 1 to 10; Ar represents an aromatic hydrocarbon composed of a plurality of aromatic rings or a quinone; $R^8$ represents hydrogen, an aromatic hydrocarbon, or a heterocycle; M represents $H_2$ or a metal ion; ML represents a transition metal complex; Por represents a porphyrin; and $X^2$ represents hydrogen, a halogen, or a phenoxy group having an alkyl group).

Examples of the reactive group include those selected from the group consisting of the followings:

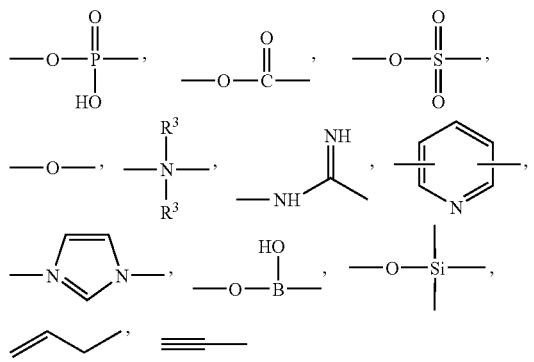

(in the formulae, $R^3$ represents a hydrogen atom or an alkyl group).

The substrate is preferably one made of a hydrophobic material or having a hydrophobized surface.

The block copolymer solution may be heated for evaporating the solvent.

In addition to the heat treatment, the substrate surface may be subjected to orientation treatment.

The heat treatment is preferably conducted within the temperature range from a temperature lower than the melting point of the block copolymer by 10° C. to a temperature lower than the decomposition temperature of the block copolymer.

Furthermore, the present invention provides a porous structure containing a hydrophobic polymer component. The porous structure has a plurality of columnar pores having surfaces including a structural unit having a reactive group.

Examples of the hydrophobic polymer component include poly(acrylate) or poly(methacrylate) having a mesogenic side chain, a long alkyl side chain, or a hydrophobic side chain, poly(styrene), and vinyl polymers.

Examples of the hydrophobic polymer component include those represented by the following formula:

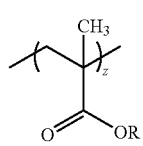

(in the formula, z denotes an integer of 5 to 500; and R is a substituent represented by following formula (2), (3), or (4):

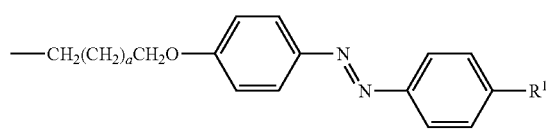
(2)

(in the formula, a is an integer of 0 to 20; and $R^1$ is a hydrogen atom or an alkyl group having 1 to 22 carbon atoms),

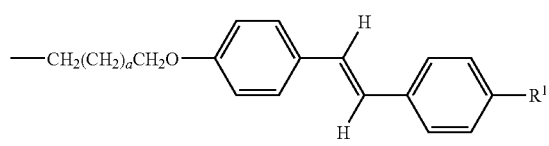
(3)

(in the formula, a is an integer of 0 to 20; and $R^1$ is a hydrogen atom or an alkyl group having 1 to 22 carbon atoms),

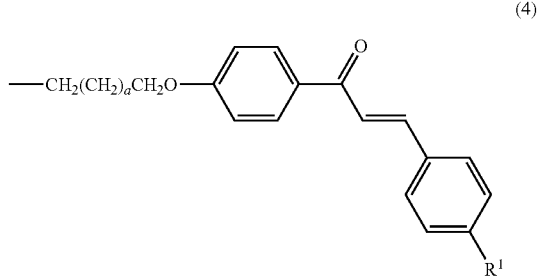
(4)

(in the formula, a is an integer of 0 to 20; and $R^1$ is a hydrogen atom or an alkyl group having 1 to 22 carbon atoms)).

Examples of the structural unit having a reactive group, an electron acceptor or electron donor, or a dye include those represented by any of the following formulae (5') to (22'):

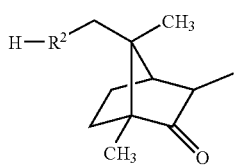
(5')

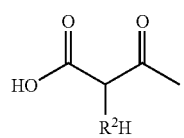
(6')

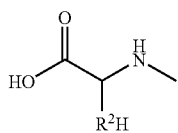
(7')

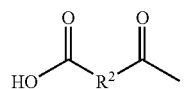
(8')

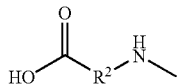
(9')

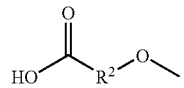
(10')

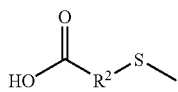
(11')

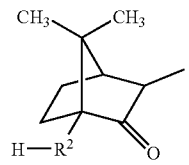
(12')

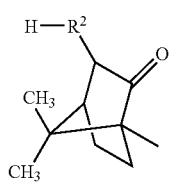
(13')

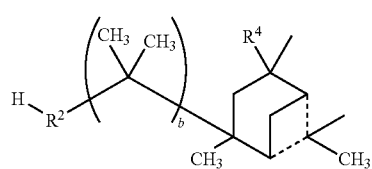
(14')

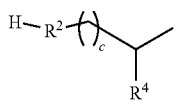

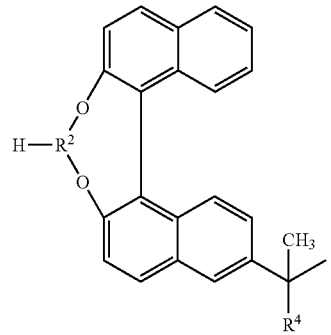

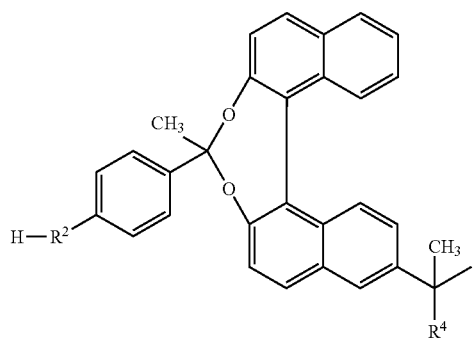

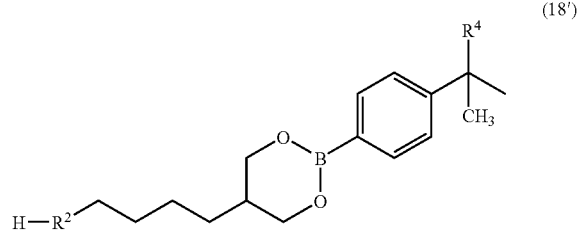

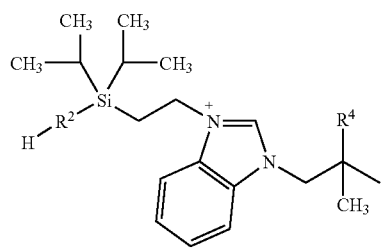

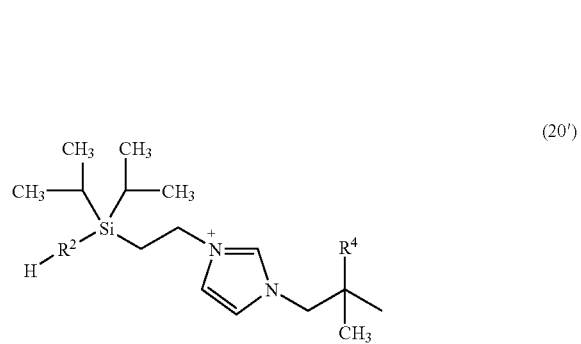

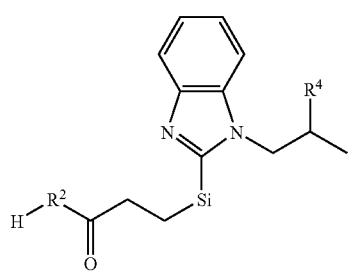

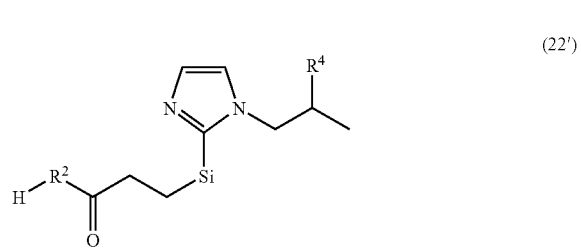

(in the formulae, $R^2$ represents a reactive group; $R^4$ represents a cyano group or a carboxylic acid ester; b and c may be the same or different and each represent an integer of 0 to 4).

Examples of the reactive group include those selected from the group consisting of the followings:

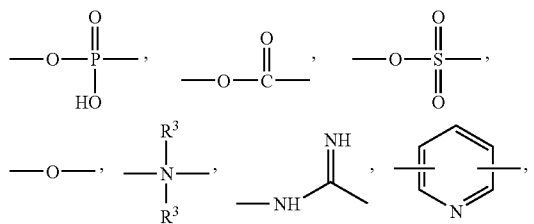

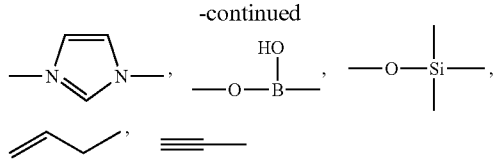

(in the formulae, $R^3$ represents a hydrogen atom or an alkyl group).

Furthermore, the present invention provides a fuel cell polymer electrolyte composed of the above-described porous membrane structure.

Furthermore, the present invention provides a fuel cell having the fuel cell polymer electrolyte.

In addition, the present invention provides a method for producing the porous structure. The method includes the step of forming pores by etching the hydrophilic polymer component portion in the microphase-separated structure membrane produced by the above-described method.

ADVANTAGES OF INVENTION

The microphase-separated structure membrane of the present invention can be used as an anisotropic ion-conductive material or a fuel cell polymer electrolyte and can be used, for example, as a photoelectronic functional polymer material, an energy-related material, a surface-modified material, a high-density recording material such as a patterned medium, or a nanofilter.

Furthermore, the porous structure of the present invention is one that can be used as an anisotropic ion-conductive material or a fuel cell polymer electrolyte and can be used as an anisotropic ion-conductive material such as a fuel cell polymer electrolyte, an ion-exchanging resin, a microreactor thin membrane, a protein-separating membrane, an organic zeolite, or a high orientation template for various pillars.

BEST MODES FOR CARRYING OUT THE INVENTION

Figure 1:
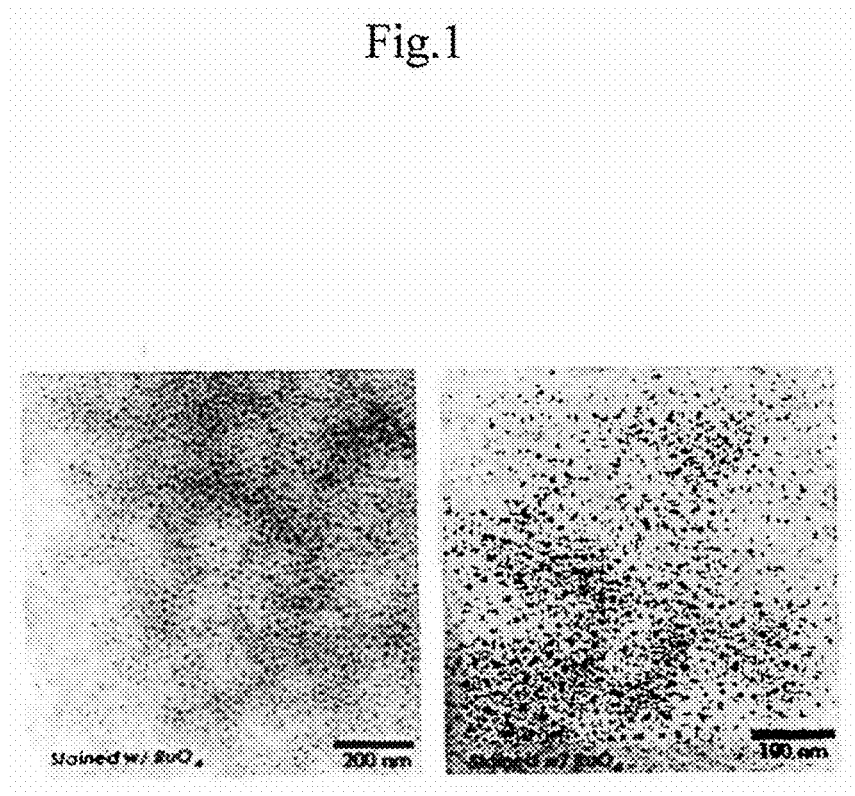
FIG. 1 is a transmission electron microscope photograph for observing a membrane direction of the resulting microphase-separated structure membrane.

First, a microphase-separated structure membrane of the present invention will be described below.

The microphase-separated structure membrane of the present invention contains a block copolymer in which a hydrophilic polymer component and a hydrophobic polymer component are coupled to each other via a structural unit having a reactive group, an electron acceptor or electron donor, or a dye. In the microphase-separated structure membrane, a cylinder structure composed of the hydrophilic polymer component lies in a matrix composed of the hydrophobic polymer component and is oriented in the direction perpendicular to the membrane surface, and the structural unit having a reactive group, an electron acceptor or electron donor, or a dye lies between the matrix and the cylinder structure.

The block copolymer contained in the microphase-separated structure membrane of the present invention is composed of a hydrophilic polymer component and a hydrophobic polymer component that are coupled to each other via a structural unit having a reactive group, an electron acceptor or electron donor, or a dye. The hydrophilic polymer component and the hydrophobic polymer component in the block copolymer are not particularly limited as long as they are incompatible to each other and are a combination such that they are phase-separated from each other by a change in temperature after being dissolved in an appropriate solvent.

Examples of the hydrophilic polymer component include poly(ethylene oxide), poly(propylene oxide), poly(vinyl alcohol), poly(acrylic acid), poly(methacrylic acid), poly(acrylamide), poly(acrylate) having a hydrophilic side chain, and poly(methacrylate) having a hydrophilic side chain. These hydrophilic polymers can provide a porous structure by being removed by etching to form pores and are therefore preferred.

The hydrophobic polymer component is not particularly limited, as described above, as long as it is in a combination with a hydrophilic polymer component such that they are phase-separated from each other by a change in temperature after being dissolved in an appropriate solvent, and examples thereof include poly(acrylate) or poly(methacrylate) having a mesogenic side chain, a long alkyl side chain, or a hydrophobic side chain, poly(styrene), and vinyl polymers.

Examples of the mesogenic side chain include one having at least one structural unit represented by the following formula:

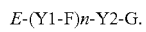

$E\text{-}(Y1\text{-}F)n\text{-}Y2\text{-}G.$

In the formula, E, F, and G may be the same or different and each represent 1,4-phenylene, 1,4-cyclohexylene, 1,4-cyclohexenylene, naphthalene-2,6-diyl, decahydronaphthalene-2,6-diyl, 1,2,3,4-tetrahydronaphthalene-2,6-diyl, 1,4-bicyclo[2.2.2]octylene, 1,3-dioxane-2,5-diyl, pyridine-2,5-diyl, pyrazine-2,5-diyl, or pyridazine-3,6-diyl, pyrimidine-2,5-diyl; Y1 and Y2 may be the same or different and each represent a single bond, —CH₂CH₂—, —CH₂O—, —OCH₂—, —C(=O)O—, —OC(=O)—, —CH≡CH—, —CH=CH—, —CF=CF—, —(CH₂)₄—, —CH₂CH₂CH₂O—, —OCH₂CH₂CH₂—, —CH=CH—CH₂CH₂—, —CH₂CH₂—CH=CH—, —N=N—, —CH=CH—C(=O)O—, or —OC(=O)—CH=CH—; and n is an integer of 0 to 3). In addition, the long alkyl side chain is preferably an alkyl side chain having 6 to 22 carbon atoms.

Examples of the hydrophobic side chain include aliphatic side chains.

In the microphase-separated structure membrane of the present invention, a structural unit having a reactive group, an electron acceptor or electron donor, or a dye lies between the matrix and the cylinder structure. The reactive group is a functional group that can form a covalent bond, an ionic bond, a coordinate bond, a hydrogen bond, or the like with another compound. Examples thereof are described below. The copolymer used in the present invention is a block copolymer in which a hydrophilic polymer component and a hydrophobic polymer component are coupled to each other via a structural unit having a reactive group, an electron acceptor or electron donor, or a dye. The reactive group, the electron acceptor or electron donor, and the dye may be those contained in the main chain. The method for producing the microphase-separated structure membrane of the present invention will be described below. According to the method, the matrix is composed of the hydrophobic polymer component of the block copolymer; the cylinder structure is composed of the hydrophilic polymer component of the block copolymer; and the reactive group, the electron acceptor or electron donor, or the dye lies between the hydrophilic polymer component and the hydrophobic polymer component of the block copolymer.

As the block copolymer, for example, those represented by the following formula (1) are preferably used.

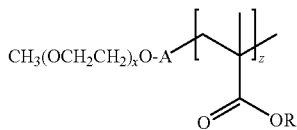

(1)

In the formula (1), x and z may be the same or different and are each an integer of 5 to 500 and preferably an integer of 40 to 120. By controlling the ratio of x and z, the sizes (areas) of the cylinder portion and the matrix portion of the resulting microphase-separated structure membrane can be adjusted.

The volume fraction of the hydrophilic polymer component in the block copolymer is preferably 10 to 90% and more preferably 10 to 50%. The microphase-separated structure membrane of the present invention is a vertically oriented hexagonal close-packed cylinder array-type phase-separated structure. In this cylinder array-type separated structure membrane, as described above, the cylinder portion is composed of the hydrophilic polymer component, and the other portion is composed of the hydrophobic polymer component. Therefore, the size and the intervals of the cylinder structure portion can be changed by changing the volume fraction of the hydrophilic polymer component. That is, a reduction in the size of the cylinder structure portion and an increase in the intervals can be achieved by decreasing the volume fraction of the hydrophilic polymer component, and an increase in the size of the cylinder portion and a reduction in the intervals can be achieved by increasing the volume fraction of the hydrophilic polymer component. The volume fraction of the hydrophilic polymer component is preferably changed within the range of 10 to 90%. If the volume fraction of the hydrophilic polymer component is less than 10%, the ratio of the cylinder portion is low, and, therefore, the generation of a cylinder array-type separated structure by vertical orientation may be difficult. On the other hand, if the volume fraction is higher than 90%, the ratio of the cylinder portion is high, and, therefore, the generation of a cylinder array-type separated structure by vertical orientation may be difficult.

The size of the cylinder structure is not particularly limited. For example, when a porous structure formed by etching the cylinder structure to form pores is used as a fuel cell polymer electrolyte, the diameter is preferably 1 to 10 nm and more preferably 1 to 3 nm.

The degree of polymerization of the hydrophilic polymer component is preferably 40 to 120. If the degree of polymerization of the hydrophilic polymer component is less than 40, the microphase-separated structure may not be formed or, even if formed, may highly depend on the degree of polymerization of the hydrophobic polymer component. On the other hand, if the degree is higher than 120, the microphase-separated structure may not be formed or, even if formed, may highly depend on the degree of polymerization of the hydrophobic polymer component. Therefore, the degree of polymerization of the hydrophilic polymer component is preferably within the above-mentioned range.

In the formula (1), examples of R include substituents represented by the following formulae (2), (3), and (4):

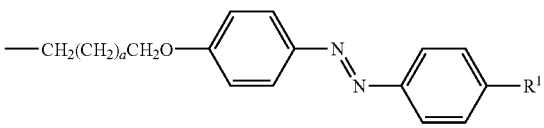

(2)

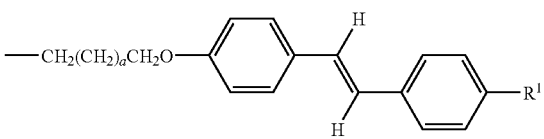

(3)

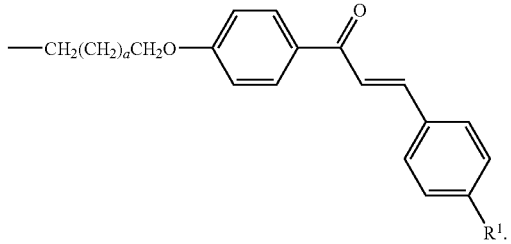

(4)

In the formulae (2), (3), and (4), a is an integer of 0 to 20 and preferably an integer of 6 to 12; and $R^1$ is hydrogen or an alkyl group having 1 to 22 carbon atoms and preferably an alkyl group having 4 to 12 carbon atoms.

In the formula (1), A, namely, the structural unit having a reactive group, an electron acceptor or electron donor, or a dye is not particularly limited, and examples thereof include those represented by any of the following formulae (5) to (32).

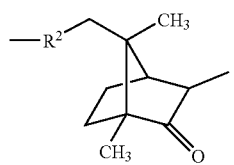

(5)

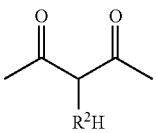

(6)

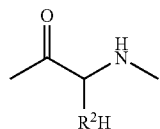

(7)

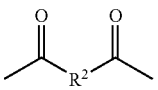

(8)

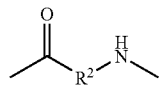

(9)

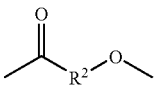

(10)

-continued
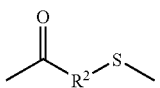  (11)
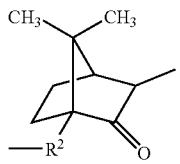  (12)
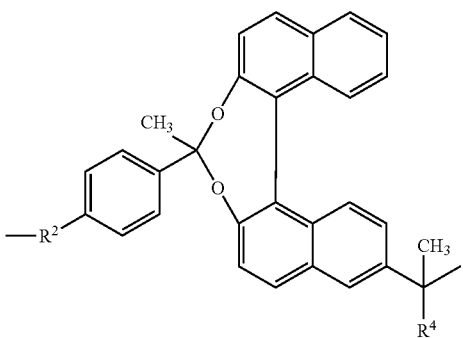  (13)
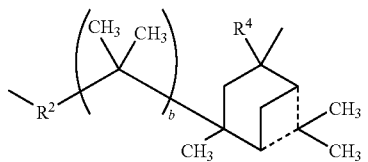  (14)
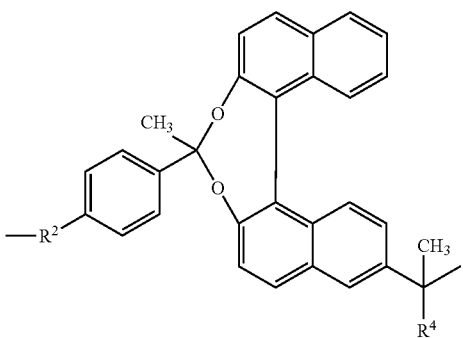  (15)
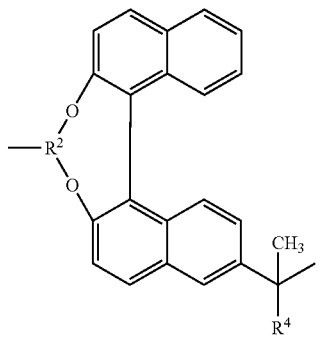  (16)
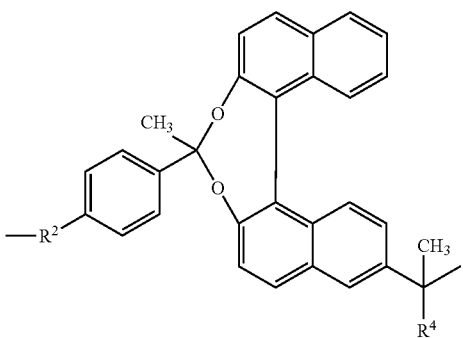  (17)
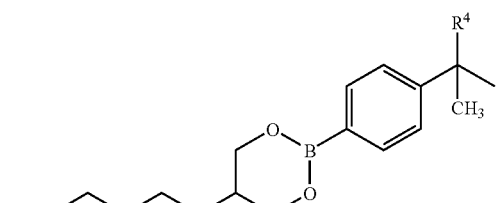  (18)
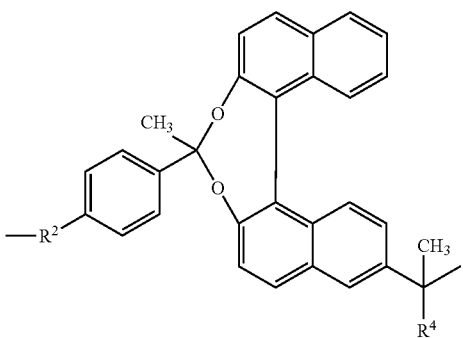  (19)
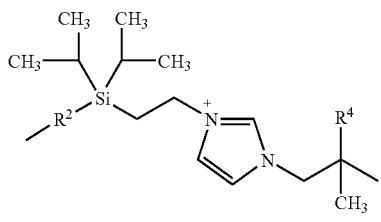  (20)
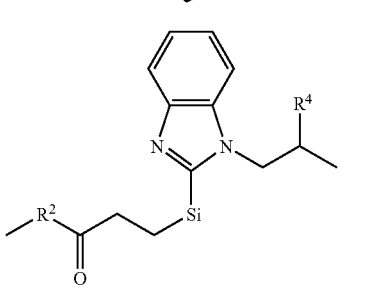  (21)
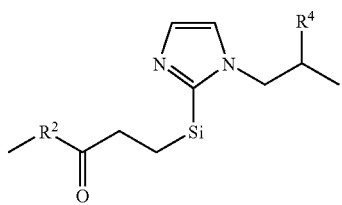  (22)

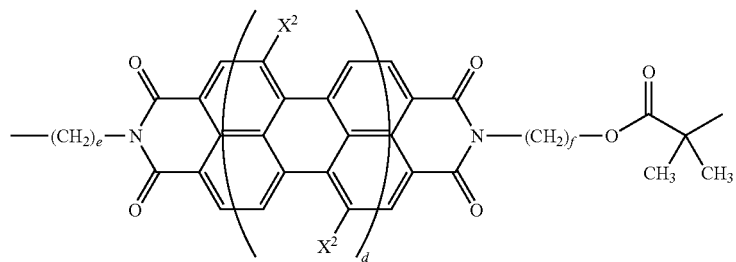
(23)
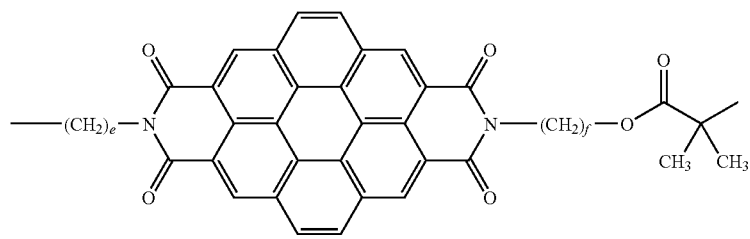
(24)
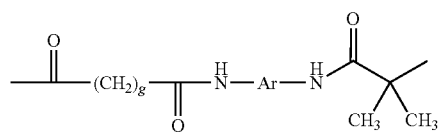
(25)
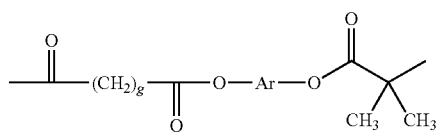
(26)
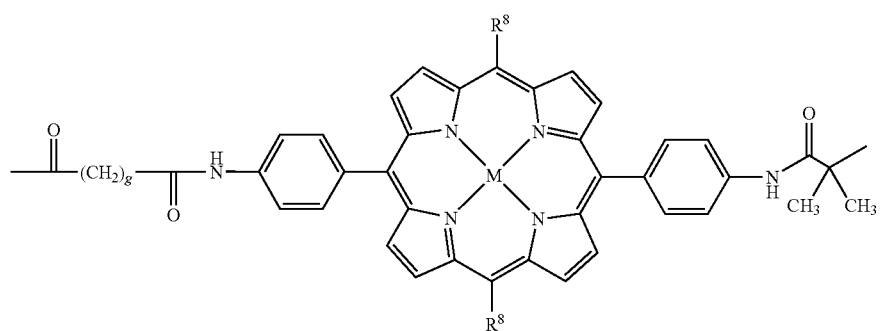
(27)
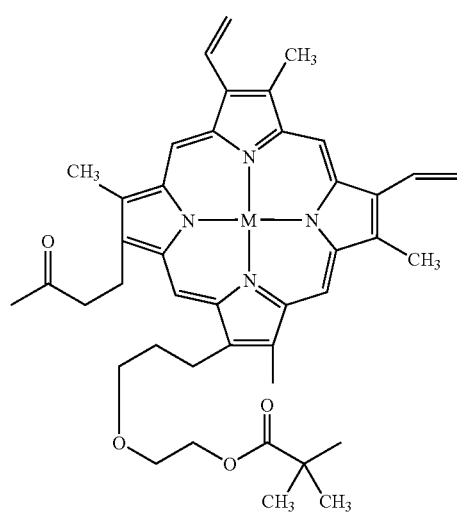
(28)

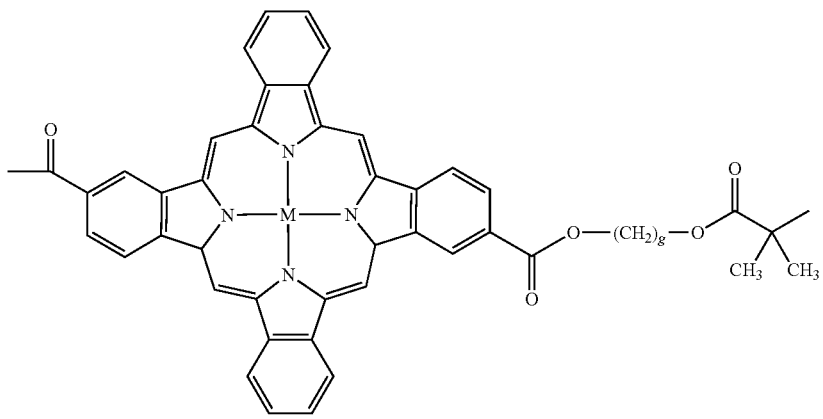

(29)

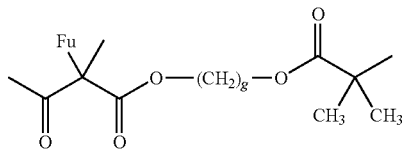

(31)

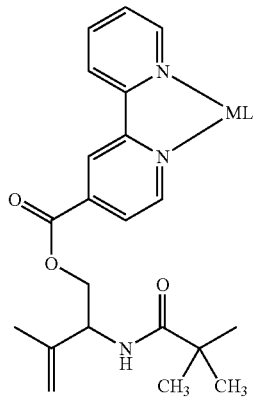

(30)

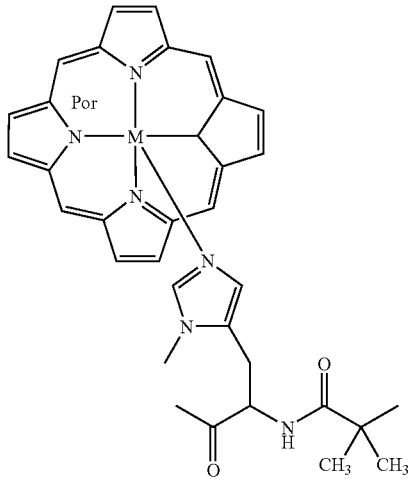

(32)

In the formulae (5) to (32), the structural unit having a reactive group is represented by the formulae (1) to (22); the structural unit having an electron acceptor is represented by the formulae (23), (24), and (31) and the formulae (25) and (26) in which Ar denotes a quinone; the structural unit having an electron donor is represented by the formulae (25) and (26) in which Ar denotes an aromatic hydrocarbon; and the structural unit having a dye is represented by the formulae (27) to (30) and (31).

In the formulae, $R^4$ represents a cyano group or a carboxylic acid ester.

Furthermore, Fu represents a fullerene, and examples of the fullerene include $C_{60}$, $C_{70}$, $C_{76}$, $C_{78}$, and $C_{82}$. These may be used alone or in a combination of two or more.

b and c may be the same or different and each represent an integer of 0 to 4 and preferably 1 or 2.

d represents an integer of 0 to 3 and preferably 0 or 1.

Furthermore, e, f, and g may be the same or different and each represent an integer of 1 to 10; and e is preferably 2 or 3; f is preferably an integer of 2 to 5; and g is preferably 2 or 3.

Furthermore, Ar represents an aromatic hydrocarbon composed of a plurality of aromatic rings or a quinone. Examples of the aromatic rings in the aromatic hydrocarbon composed of a plurality of aromatic rings include naphthalene, anthracene, phenanthrene, pyrene, and perylene, and examples of the quinone include anthraquinone.

In addition, $R^8$ represents hydrogen, an aromatic hydrocarbon, or a heterocycle. Examples of the aromatic hydrocarbon are the same as those of Ar, and examples of the heterocycle include pyridine and imidazole.

Furthermore, M represents $H_2$ (which means a porphyrin not containing metals) or a metal ion such as $Zn^{2+}$, $Fe^{2+}$, $Fe^{3+}$, $Cu^{2+}$, $Mn^{2+}$, or $Pt^{2+}$.

In addition, ML represents a transition metal complex. Examples of the transition metal complex include $Ru(bpy)^2$ and $Cu(bpy)$. Note that byp means 2,2'-bipyridine.

Furthermore, Por represents a porphyrin, and examples of the porphyrin include tetraphenylporphyrin, protoporphyrin, and chlorophyll.

$X^2$ represents hydrogen, a halogen, or a phenoxy group having an alkyl group.

Examples of the phenoxy group having an alkyl group include those represented by the following formulae:

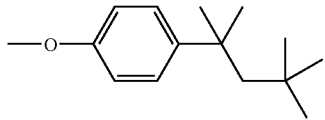

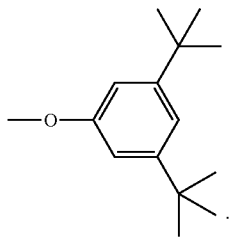

Furthermore, $R^2$ represents a reactive group and is, for example, selected from the group shown below. Note that, in the description, those in which hydrogen atoms attached to those represented by the following formulae as the examples of $R^2$ or the reactive group are also simply referred to as $R^2$ or a reactive group in some cases.

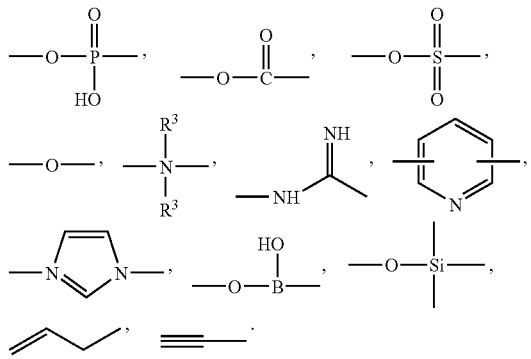

In the formulae above, $R^3$ represents a hydrogen atom or an alkyl group. The alkyl group preferably has 0 to 4 carbon atoms.

Examples of the block copolymer represented by the formula (1) include those having structural units having a reactive group, an electron acceptor or electron donor, or a dye represented by the above-mentioned formulae (5) to (32) and are respectively represented by formulae (5″) to (32″). In the formulae (5″) to (32″), $R^5$ represents a hydrophilic polymer component; and $R^6$ represents a hydrophobic polymer component. That is, in the block copolymer used in the present invention, the hydrophilic polymer component and the hydrophobic polymer component are coupled to each other via the structural unit having a reactive group, an electron acceptor or electron donor, or a dye.

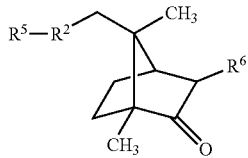

(5″)

(6″)

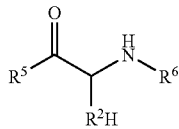

(7″)

(8″)

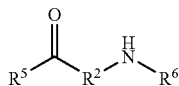

(9″)

(10″)

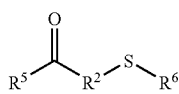

(11″)

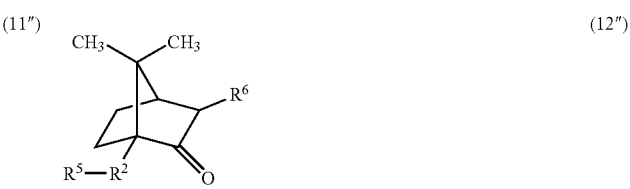

(12″)

-continued
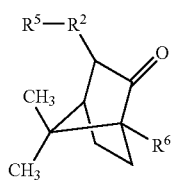 (13″)
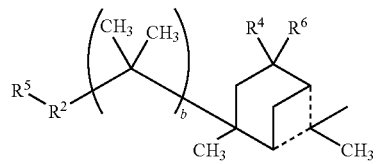 (14″)
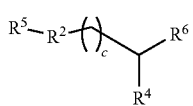 (15″)
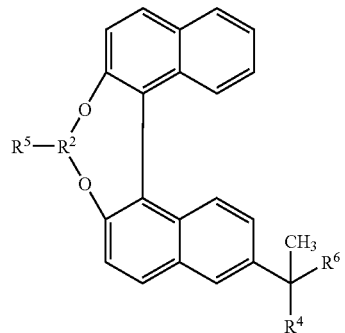 (16″)
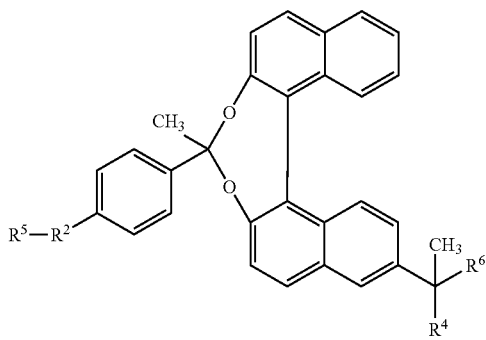 (17″)
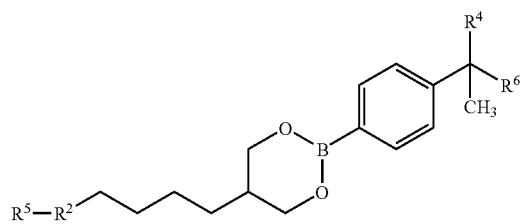 (18″)
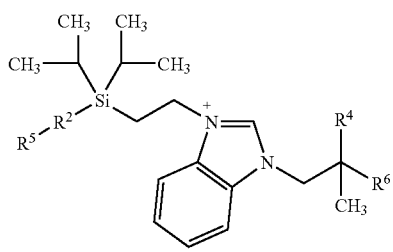 (19″)
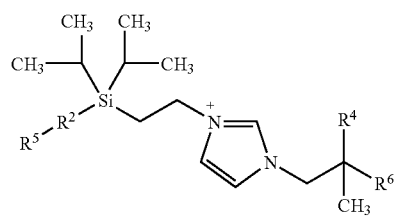 (20″)
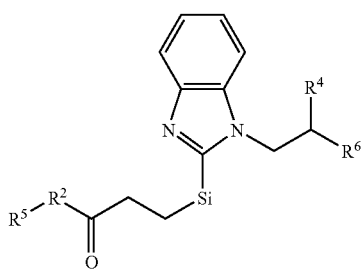 (21″)
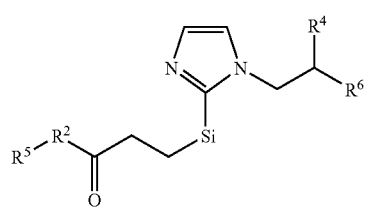 (22″)

-continued
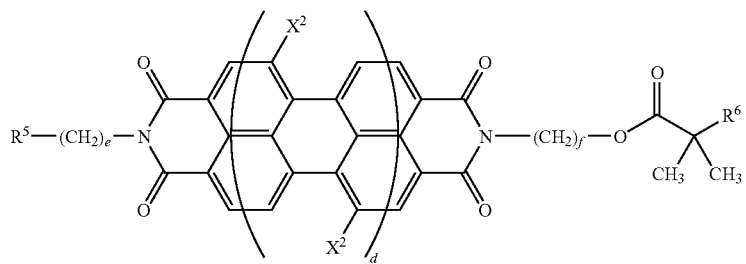
(23″)
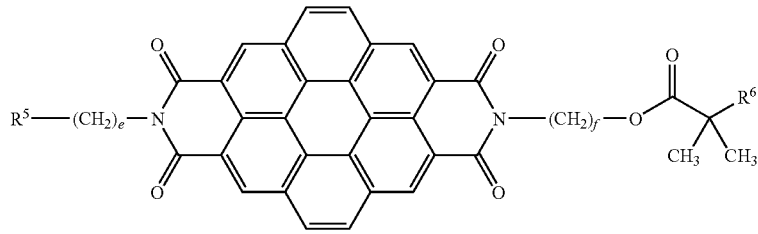
(24″)
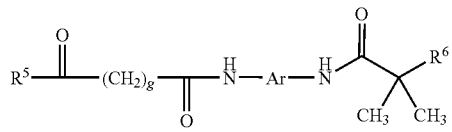
(25″)
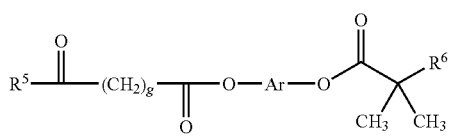
(26″)
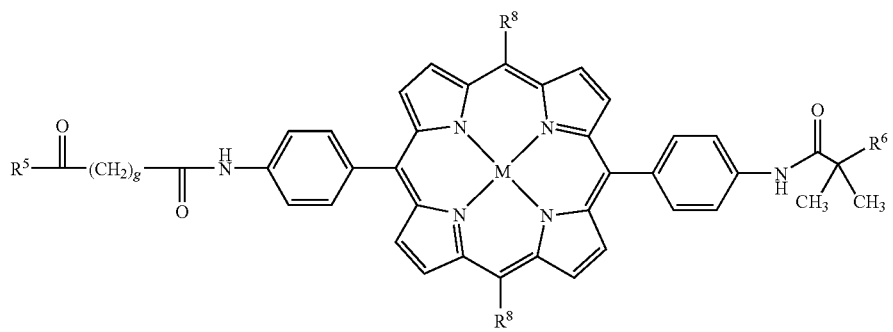
(27″)
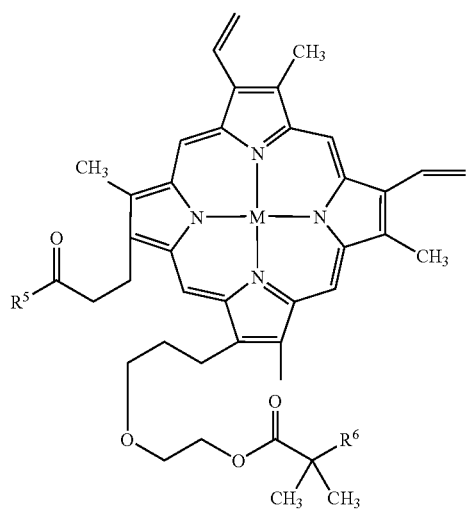
(28″)

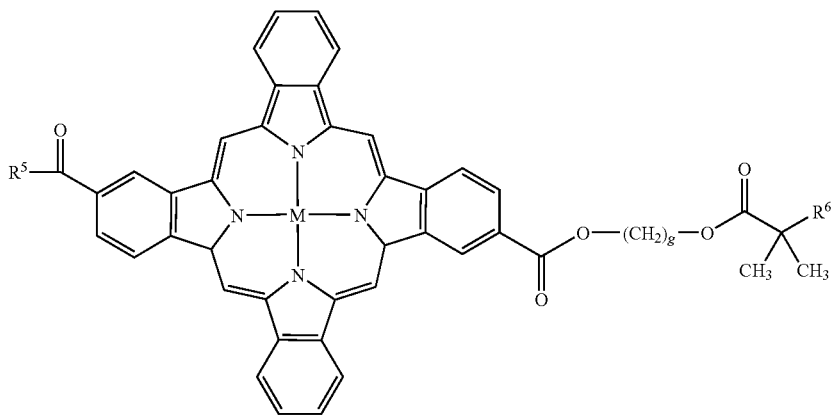

(29″)

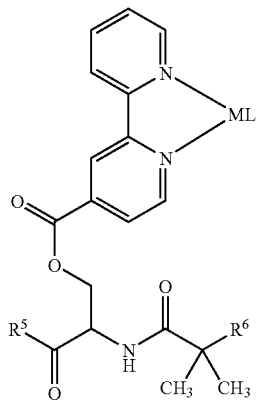

(30″)

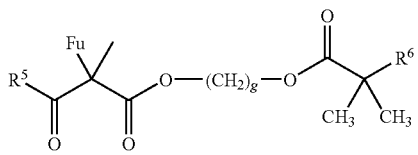

(31″)

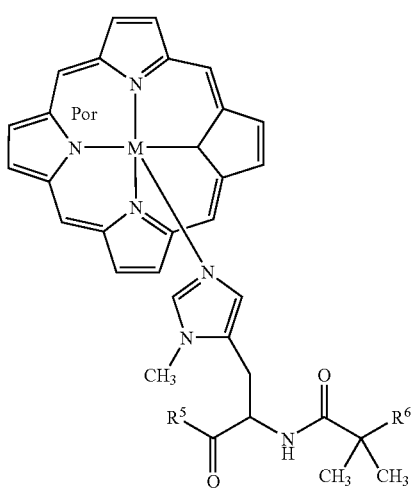

(32″)

In the formulae (5″) to (32″) above, $R^4$, Fu, b, c, d, e, f, g, Ar, $R^8$, M, ML, Por, and $R^2$ are the same as those in the above-mentioned formulae (5) to (32).

The block copolymer represented by formula (1) preferably has a molecular weight of 5000 to 100000 and more preferably 10000 to 50000.

The molecular weight distribution (Mw/Mn) of the block copolymer used in the method for producing the microphase-separated structure membrane of the present invention is preferably 1.4 or less and more preferably 1.3 or less. Note that, in the description, the molecular weight distribution (Mw/Mn) is a value calculated from the weight-average molecular weight Mw and the number-average molecular weight Mn in polystyrene conversion measured by a gel permeation chromatograph (GPC) method.

A specific example of the method is as follows:

A gel permeation chromatography column (trade name: TSKgel HXL-M) manufactured by Tosoh Corporation is set to a high-performance liquid chromatographic device, and the molecular weight is measured using tetrahydrofuran as the eluent. First, polystyrene having a known average molecular weight is subjected to the measurement as a standard sample. The elution time of a measurement sample is compared to the elution time of the polystyrene, and the weight-average molecular weight Mw and the number-average molecular weight Mn are calculated in polystyrene conversion to determine the molecular weight distribution.

The method for producing the block copolymer is described below.

The microphase-separated structure membrane of the present invention may be formed on a substrate. The substrate is preferably one made of a hydrophobic material or having a hydrophobized surface. As such a substrate, for example, a substrate of polyester or polyimide, a mica plate, a silicon wafer, a quartz plate, a glass plate, or any of these substrates in which the surfaces are subjected to hydrophobization treatment such as carbon evaporation or silylation is preferably used. The thickness of the substrate used in this occasion is not particularly limited.

Next, the porous structure of the present invention will be described.

The porous structure of the present invention is constituted by forming pores by etching the above-described cylinder structure of the microphase-separated structure membrane of the present invention. That is, the porous structure of the present invention contains a hydrophobic polymer component and has a plurality of columnar pores having surfaces including a structural unit having a reactive group.

Examples of the etching include wet etching or dry etching in which only the cylinder structure (hydrophilic polymer component) is preferentially removed; and a method employing a combination of etching and decomposition by irradiation with β rays having a wavelength of 400 nm or less or ultraviolet rays. In this case, it is preferable to use a solvent that makes the etching rate ratio of the hydrophilic polymer component portion (cylinder structure portion) and the hydrophobic polymer component portion (matrix portion) higher in the island structure portion. In addition, dry etching that makes the etching rate of the cylinder structure portion higher than that of the matrix structure portion can be used.

Other examples of the etching method include ozone etching, fluorine ion etching, and plasma etching.

As described above, since the hydrophilic polymer component portion of the microphase-separated structure membrane is removed by the etching treatment, the resulting porous membrane structure has a plurality of columnar pores, and a structural unit having a reactive group is exposed to the pore surfaces. That is, in the method for producing the porous structure of the present invention, since the block copolymer in which the hydrophilic polymer component and the hydrophobic polymer component are coupled to each other via the structural unit having a reactive group is used, the structural unit having a reactive group lies between the matrix portion and the cylinder structure portion of the microphase-separated structure membrane; and, therefore, the hydrophobic polymer component portion of the matrix portion remains in its own form, and the reactive group is formed on the pore surfaces, by removing the hydrophilic polymer portion by etching. That is, the present invention also provides a porous structure containing a hydrophobic polymer component and having a plurality of columnar pores having surfaces including the structural unit having a reactive group.

As describe above, in the porous structure of the present invention, since the pores are formed in the hydrophilic polymer portion (cylinder structure portion) of the microphase-separated structure membrane of the present invention, the polymer constituting the porous structure is a polymer having the reactive group at one end of the hydrophobic polymer component. Specifically, the polymer has a structure in which the hydrophilic polymer portion is removed from the structure represented by any of the above-mentioned formulae (5") to (16") and (18") to (22"), i.e., a structure in which the moiety $R_5$ is removed from a structure represented by any of the formulae (5") to (16") and (18") to (22"). Note that, in the formula (17"), the moiety to be cleaved is different. Structures in which the hydrophilic polymer portions are removed from the structures represented by the formulae (5") to (16") and (18") to (22"), i.e., the structures of the structural portions having reactive groups included in the hydrophobic polymer constituting the porous structures of the present invention are shown below as formulae (5') to (22'). In the formula (17'), as shown below, two hydroxyl groups serving as the reactive groups are formed after removal of the hydrophilic polymer portion.

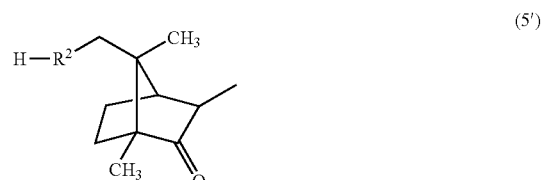
(5')

(6')

(7')

(8')

(9')

(10')

(11')

(12')

(13')

-continued (14')
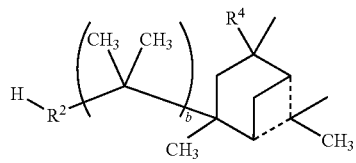

(15')
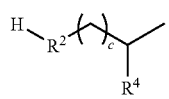

(16')
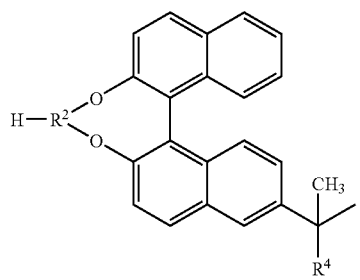

(17')
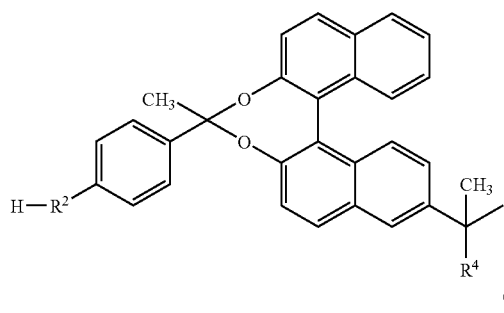

(18')
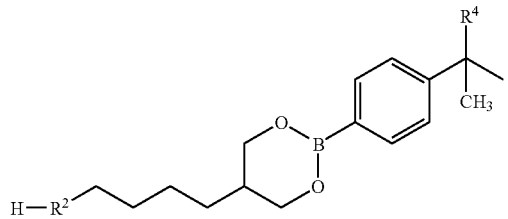

(19')
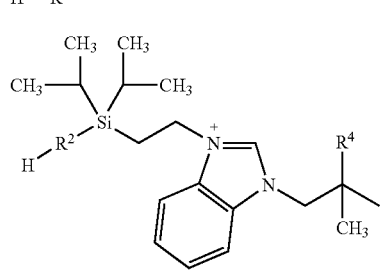

(20')
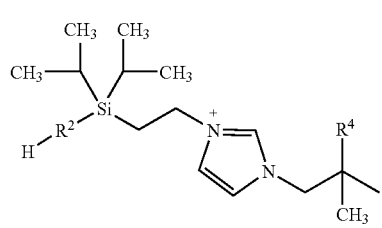

-continued (21')
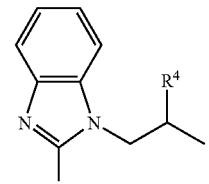

(22')
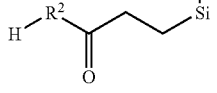

In the formulae (1') to (22'), $R^2$, $R^4$, b, and c are the same as those described in the formulae (1) to (32).

In addition, examples of the reactive group include those selected from the group consisting of the followings:

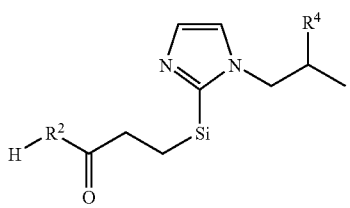

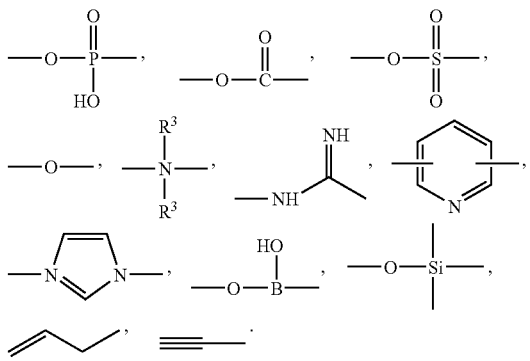

On the surfaces of the pores of the thus prepared porous structure, the structural unit having a reactive group is formed. Therefore, for example, the porous structure can be used as a filter for a compound that can produce a covalent bond, an ionic bond, a coordinate bond, a hydrogen bond, or the like with the reactive group. Furthermore, a function as a catalyst can be imparted to a molecule that chemically reacts with the reactive group by making the molecule to pass through the pore. In addition, the porous structure can be used as, for example, a fuel cell polymer electrolyte, an ion-exchanging resin, a microreactor thin membrane, a protein-separating membrane, an organic zeolite, or a high orientation template for various pillars. By actually applying the porous structure to the above-mentioned usage, further improvements in sensitivity, efficiency, and so on can be expected. Furthermore, examples of other uses of the porous structure of the present invention include micromachines or sensors using the spacer function for forming precise spaces or flow paths, biodevices, microreactor chips, and artificial organ implants, and also various types of functional members for, for example, microfilters, precise filtration membranes (micromembranes), battery separators (for example, battery separators used in various types of batteries such as a nickel-hydrogen battery and a lithium-ion battery), members of fuel cells (for example, various types of members used in fuel cells, such as a gas diffusion layers, a current collector layer, a water-permeable layer, and a moisture retention layer), micronozzles (for example, a printer micronozzle, an injection micronozzle, a spray micronozzle, and a space micronozzle), distributors, gas diffusion layers, and micro-flow paths.

Furthermore, in the application of the porous structure of the present invention to a fuel cell polymer electrolyte, protons and hydroxide ions serving as electrolytes that move in the membrane can be efficiently transported along the ionic groups vertically oriented on the porous structure walls. In the actual application of such a porous body to the above-mentioned purposes, improvements such as an enhancement in conductivity and a reduction in size of the electrolyte membrane of a fuel cell can be expected.

A preferred method for producing the microphase-separated structure membrane of the present invention will now be described.

The method for producing the microphase-separated structure membrane of the present invention includes the step of preparing a block copolymer solution by dissolving a block copolymer in which a hydrophilic polymer component and a hydrophobic polymer component are coupled to each other via a structural unit having a reactive group in a solvent that can dissolve the block copolymer; the step of applying the block copolymer solution to a substrate surface or dropwise adding the block copolymer solution in a liquid that does not dissolve the solution; and the step of forming the microphase-separated structure membrane of the block copolymer by evaporating the solvent.

As the copolymer used in the method for producing the microphase-separated structure membrane of the present invention, the block copolymers described in the microphase-separated structure membrane of the present invention are used.

The method for producing the block copolymer used in the method for producing the porous structure of the present invention is not particularly limited, but the block copolymer is preferably produced by atom transfer radical polymerization (ATRP) from the standpoints that the molecular weight and the structure of the resulting block copolymer can be controlled and that a copolymer with a structural unit having a reactive group can be easily produced.

In the atom transfer radical polymerization, an organic halide or a halogenated sulfonyl compound is used as an initiator, and a metal complex having an element of group VIII, IX, X, or XI in the periodic table as a central metal is used as a catalyst.

In the method, usually, the polymerization rate is very high, and though they are radical polymerization, which readily causes a termination reaction such as coupling between radicals, the polymerization livingly progresses to give a block copolymer having a narrow molecular weight distribution. In addition, the molecular weight can be freely regulated by controlling the charging ratio of the monomer and the initiator used.

The organic halide or halogenated sulfonyl compound used as the initiator in the ATRP method is a halogenated compound in which a structural unit represented by any of the formulae (5) to (32) is coupled to one end of the above-mentioned hydrophilic polymer component. That is, the structural unit having a reactive group contained in the block copolymer used in the present invention can have a structure that can serve as a polymerization-starting point in the ATRP method.

Furthermore, in the ATRP method, as a transition metal (X) complex used as a catalyst for the atom transfer radical polymerization, a metal complex having a transition metal (X) of group VIII, IX, X, or XI as a central metal is used, and preferred examples thereof include complexes of monovalent or zero-valent copper, divalent ruthenium, divalent iron, and divalent nickel. Among them, copper complexes are preferred from the standpoints of cost performance and reaction control. Examples of the monovalent copper compound include copper(I) chloride, copper(I) bromide, copper(I) iodide, copper(I) cyanide, copper(I) oxide, and copper(I) perchlorate. Among them, copper(I) chloride and copper(I) bromide are preferred from the viewpoint of polymerization control. Examples of the divalent ruthenium include (cumene)dichlororuthenium dimer and tris(triphenylphosphine)ruthenium dichloride.

When a monovalent copper compound is used, a ligand may be added in order to enhance the catalyst activity. Examples the ligand include trioctylamine, triethylamine, 2,2'-bipyridyl compounds such as 2,2'-bipyridyl and its derivatives (for example, 4,4'-dinolyl-2,2'-bipyridyl and 4,4'-di(5-nolyl)-2,2'-bipyridyl), 1,10-phenanthroline compounds such as 1,10-phenanthroline and its derivatives (for example, 4,7-dinolyl-1,10-phenanthroline and 5,6-dinolyl-1,10-phenanthroline), and polyamines such as tetramethylethylenediamine (TMEDA), pentamethyldiethylenetriamine, and hexamethyl(2-aminoethyl)amine.

Furthermore, the ATRP method can be conducted in the absence of solvents (bulk polymerization) or in the presence of various solvents. Examples of the solvent include hydrocarbon solvents, halogenated aromatic hydrocarbon solvents, ketone solvents, alcohol solvents, nitrile solvents, and ester solvents. These can be used alone or as a mixture of two or more. Preferred solvents are, for example, dichlorobenzene and anisole.

In addition, the ATRP method can be usually performed at a temperature of from about room temperature, 20° C., to about 120° C., and is preferably performed at a temperature of from about 20 to about 120° C. A polymerization temperature of lower than the above mentioned temperature makes the viscosity of the reaction system too high, which may reduce the reaction rate a level that is too low, and a temperature higher than the above-mentioned temperature does not allow to use inexpensive polymerization solvents.

Examples of the method for producing the block copolymer by the ATRP method include a method in which a monomer is successively added, a method in which a polymer synthesized in advance is used as a polymeric initiator for polymerizing the subsequent block, and a method in which separately polymerized polymers are coupled by a reaction thereof. These methods can be appropriately used depending on the purposes, but the method in which a polymer synthesized in advance is used as a polymeric initiator for polymerizing the subsequent block is preferred from the standpoint of easiness of polymerization process.

In addition, the method for producing the block copolymer used in the present invention is not limited to the above-described ATRP method, and, for example, a method in which a hydrophilic polymer portion and a hydrophobic polymer portion are coupled to each other and then structural unit having a reactive group is coupled thereto may be used.

In the method for producing the microphase-separated structure membrane of the present invention, first, the block copolymer is dissolved in a solvent that can dissolve the block copolymer to prepare a block copolymer solution.

The solvent, which can dissolve the block copolymer, used for preparing the block copolymer solution is not particularly limited as long as the solvent can dissolve the block copolymer, and examples thereof include benzene, toluene, xylene, chloroform, dichloromethane, tetrahydrofuran, dioxane, carbon tetrachloride, ethylbenzene, propylbenzene, ethylene dichloride, methyl chloride, and mixtures thereof. Furthermore, the concentration of the block copolymer in the solution is preferably about 0.1 to 5% by mass. In addition, when the block copolymer is not easily dissolved, for example, stirring or heating may be conducted.

Then, the block copolymer solution is applied to a substrate surface, or the block copolymer solution is dropwise added to a liquid that does not dissolve the solution. The substrate is preferably a substrate made of a hydrophobic material or a substrate having a hydrophobized surface. As such a substrate, for example, a substrate of polyester or polyimide, a mica plate, a silicon wafer, a quartz plate, a glass plate, or any of these substrates in which the surfaces are subjected to hydrophobization treatment such as carbon evaporation or silylation is preferably used. The thickness of the substrate used in this occasion is not particularly limited.

The method for applying the block copolymer solution to the substrate surface is not particularly limited, and the application can be performed by a method such as spin coating, casting, dipping, or bar coating. The coating amount is not particularly limited, but is usually an amount to give a membrane thickness of about 30 nm to about 10 µm and is preferably about 0.002 to 0.1 mL per 1 $cm^2$ of substrate surface.

Furthermore, the liquid that does not dissolve the block copolymer solution is not particularly limited as long as it does not dissolve the solvent used for dissolving the block copolymer, and examples thereof include water, electrolyte solutions, mercury, liquid paraffin, and octanol. The amount to be dropwise added is preferably 1 to 100 drops per 1 $cm^2$ of liquid.

Then, a microphase-separated structure membrane of the block copolymer is formed by evaporating the solvent. Examples of the method for evaporating the solvent include a method in which the substrate is heated. When the substrate is heated, the heating temperature is preferably higher than a temperature that is lower than the melting point of the block copolymer by 10° C. In addition, the heating temperature is preferably lower than the decomposition temperature of the block copolymer. Since the polymer can be imparted with sufficient fluidity to form a phase-separated structure by controlling the heating temperature within the above-mentioned range, it is preferable that the heating temperature is controlled within the above-mentioned range.

The orientation treatment may be performed by applying an electric field of $1\times10^5$ to $3\times10^7$ V/m and preferably $1\times10^5$ to $3\times10^6$ V/m in a humidified state. Since the block copolymer is oriented along the electric field, the electric field may be applied in a desired direction. For example, the orientation of the phase-separated structure can be controlled in a region-selective manner by using a micro comb-shaped electrode or by applying a voltage by bringing a micro electrode close to an electrode covered with a polymer. In particular, molecules oriented so as to be approximately perpendicular to a substrate give a cylinder structure being perpendicular to the substrate and are therefore highly useful. Therefore, it is preferable to orient the block copolymer so as to be approximately perpendicular to a substrate by applying an electric field being approximately perpendicular to the substrate.

In addition, the electric field may be constant within the range of $1\times10^5$ to $3\times10^7$ V/m and may be in either direction of (+) or (−). Furthermore, the upper limit of the electric field may be controlled to $1\times10^5$ to $3\times10^7$ V/m, and the electric field may be swept in the (+) direction, the (−) direction, or both directions alternately (specifically, sweeping the electric potential to be applied). Since the application of the electric field with switching the direction makes the orientation further clear and is therefore preferred.

The method for applying an electric field is not particularly limited, and a conventionally known method may be used. In an example of a simple method, a film is formed using a substrate as an electrode, an electrolyte is applied onto the film, and a desired voltage is applied between the electrode substrate and the electrolyte.

Any electroconductive material can be used as an electrode material of the electrode substrate, and examples thereof include metal plates of platinum, stainless steel, and gold; glass, a plastic film, and a silicon wafer that are covered with graphite or indium tin oxide. As the electrolyte, water or an organic solvent, such as tetrahydrofuran, chloroform, dimethyl sulfoxide, or dimethylformamide, is used as the solvent, and, in this solvent, an electrolyte, such as potassium chloride, sodium chloride, potassium bromide, sodium sulfate, sodium perchlorate, or sodium nitrate, is dissolved as a solute.

In the thus prepared microphase-separated structure membrane, a hexagonal close-packed cylinder structure, which is a structure cyclically separated in a nanometer region, is formed. The cylinder structure (composed of the hydrophilic polymer component) is formed by the domain of the hydrophilic polymer chain, and the matrix (composed of the hydrophobic polymer component) is formed by the hydrophobic polymer chain.

A method for forming the porous structure of the present invention will now be described.

The method for producing the porous structure of the present invention include the step of forming pores by etching the hydrophilic polymer component portion in the microphase-separated structure membrane prepared by the above-mentioned method for producing the microphase-separated structure membrane.

Examples of the etching include wet etching or dry etching in which only a cylinder structure (hydrophilic polymer component) is preferentially removed; and a method employing a combination of etching and decomposition by irradiation with β rays having a wavelength of 400 nm or less or ultraviolet rays. In this case, it is preferable to use a solvent that makes the etching rate ratio of the hydrophilic polymer component portion (cylinder structure portion) and the hydrophobic polymer component portion (matrix portion) higher in the island structure portion. In addition, dry etching that makes the etching rate of the cylinder structure portion higher than that of the matrix structure portion can be used.

Other examples of the etching method include ozone etching, fluorine ion etching, and plasma etching.

(32″)

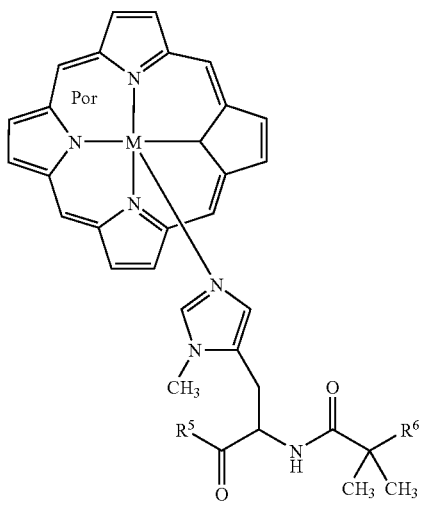

EXAMPLES

The present invention will now be specifically described with reference to examples, but is not limited thereto.

Example 1

Under an argon atmosphere, 2.5 g of one-end methoxy-polyethylene glycol (MeO—PEO$_{114}$OH) and 1.74 g of trioctylamine were dissolved in 20 mL of methylene chloride, followed by cooling to −20° C. Then, 1.64 g of 3-bromo-9-camphor sulfonic acid chloride was put thereinto, followed by stirring at room temperature for 24 hours. Then, the reaction solution was gradually dropwise added to ether (150 mL) with stirring to precipitate the product. The resulting precipitate was filtered, and the collected crude product was put into 2-propanol (200 mL), followed by being slowly heated to 60° C. to dissolve the crude product. Then, the resulting solution was left for standing for 12 hours at room temperature to precipitate a solid. The precipitated solid was filtered and dried under reduced pressure to obtain MeO—PEO$_{114}$CamBr (polyethyleneoxy-α-methoxy-ω-3-bromo-10-camphorsulfonate). The introduction ratio of camphorsulfonic acid determined by $^1$H-NMR was 100%.

Example 2

MeO—PEO$_{114}$CamBr was prepared by the same procedure as in Example 1, except that triethylamine was used instead of trioctylamine. The introduction ratio of camphorsulfonic acid in the resulting MeO—PEO$_{114}$CamBr was 60%.

Example 3

MeO—PEO$_{114}$COMe$_2$Br was prepared by the same procedure as in Example 1, except that triethylamine was used instead of trioctylamine, isobutyro-butyric acid chloride (2.0 g) was used instead of 3-bromo-9-camphor sulfonic acid chloride, and all the reactions were performed at 70° C. The introduction ratio of carboxylic acid in the resulting MeO—PEO$_{114}$COMe$_2$Br was 100%.

Example 4

A block copolymer was produced as in below using the MeO—PEO$_{114}$CamBr prepared in Example 1 as a polymeric initiator. Under an argon atmosphere, 50 mg of MeO—PEO$_{114}$CamBr, 490 mg of a liquid-crystalline methacrylic acid ester monomer (MA(Chal)) represented by the formula below, 9.0 mg of RuCl$_2$ (p-cymene) (rutheniumdimer), and 6.7 mg of tricyclohexylphosphine were dissolved in 2.5 mL of anisole, followed by stirring at 80° C. for 24 hours. After the stirring for 24 hours, the reaction solution was exposed to the air for inactivating the catalyst to terminate the polymerization reaction. Then, the reaction solution was cooled to room temperature and then diluted with 15 mL of chloroform. The diluted reaction solution was applied to a silica gel column for removing the catalyst, and subsequently the solvent was evaporated. Then, the resulting product was washed with hot isopropanol for removing the unreacted monomers and the polymeric initiator to give a block copolymer. The degree of polymerization of the liquid-crystalline polymethacrylic acid ester in the resulting block copolymer was determined by $^1$H-NMR, and the number-average molecular weight (Mn) and the molecular weight distribution (Mw/Mn) were determined by gel permeation chromatography using polystyrene as the standard.

The degree of polymerization of the liquid-crystalline polymethacrylic acid ester was 53, the number-average molecular weight (Mn) was 41200, and the molecular weight distribution (Mw/Mn) was 1.32.

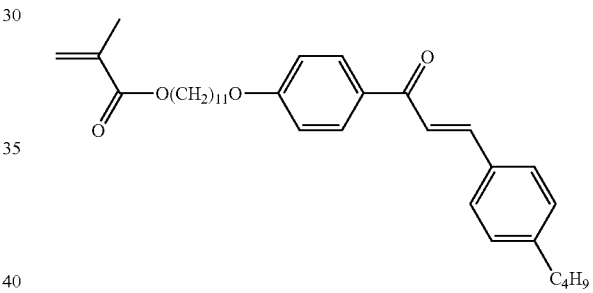

Example 5

A block copolymer was prepared by the same procedure as in Example 4, except that 1.0 g of the liquid-crystalline methacrylic acid ester monomer (MA(Chal)) was used. The degree of polymerization of the liquid-crystalline polymethacrylic acid ester in the resulting block copolymer was 121, the number-average molecular weight (Mn) was 39800, and the molecular weight distribution (Mw/Mn) was 1.39.

Example 6

The MeO-PEO$_{114}$CamBr prepared in Example 1 and the block copolymers prepared in Examples 5 and 6 were applied to gel permeation chromatography to confirm that the molecular weights of the block copolymers prepared in Examples 5 and 6 were shifted to the larger molecular weight side than that of the MeO-PEO$_{114}$CamBr prepared in Example 1 while maintaining the narrow molecular weight distribution. This indicates that the products prepared in Examples 5 and 6 are block copolymers.

Example 7

The block copolymer prepared in Example 3 was dissolved in toluene in a concentration of 2% by weight. The resulting block copolymer solution was developed on a water surface.

The resulting water surface developed film was skimmed and transferred to a steel grid, followed by heat treatment at 80° C. under vacuum for 24 hours to give a microphase-separated structure membrane. The resulting microphase-separated structure membrane was exposed to ruthenium oxide vapor for selectively staining only the PEO domain, and a transmission electron microscope photograph thereof was observed. The transmission electron microscope photograph is shown in FIG. 1. FIG. 1 is a transmission electron microscope photograph for observing a membrane direction of the resulting microphase-separated structure membrane.

Example 8

The block copolymer prepared in Example 3 was dissolved in toluene in a concentration of 2% by weight. The resulting block copolymer solution was developed on a silicon substrate by spin coating. The resulting membrane was subjected to heat treatment at 80° C. under vacuum for 24 hours to give a microphase-separated structure membrane. The resulting thin membrane was irradiated with light of 313 nm for cross-linking the chalcone moiety of the liquid-crystalline polymer region. Then, the thin membrane was treated with heat at a temperature of 160 to 180° C. for 24 hours for cleaving the sulfonate moiety. The resulting thin membrane was washed with methanol to remove poly(ethylene oxide) as the free cylinder portion, followed by drying at room temperature under vacuum for 24 hours.

The method for evaluating thin membrane

The thin membrane was evaluated by FTIR before and after the removal of poly(ethylene oxide) to confirm disappearance of the 1200 to 1100 $cm^{-1}$ attributed to the stretching vibration of C—O—C of the poly(ethylene oxide) after the removal of the poly(ethylene oxide) and was evaluated by Raman spectroscopy to confirm a shift from 1172 to 1165 $cm^{-1}$ attributed to the stretching vibration of $SO_2$—O of sulfonate to 1165 to 1150 $cm^{-1}$ and 1352 to 1342 $cm^{-1}$ attributed to the stretching vibration of $SO_3H$ of sulfonic acid after etching.

Example 9

An initiator was synthesized according to the following chart.

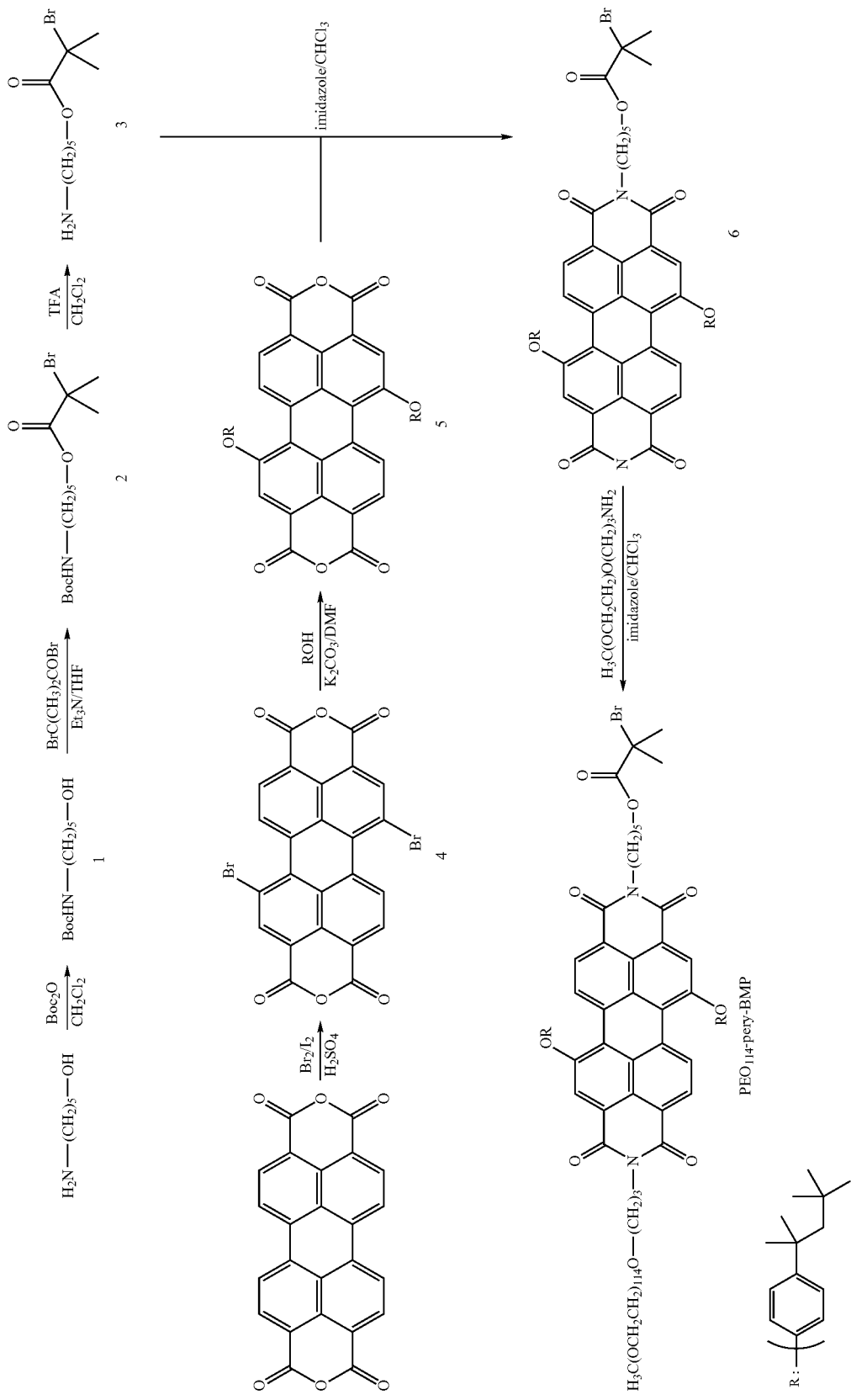

Each step in the above chart will be described below.

Synthesis of 5-(Boc-amino)-1-pentanol (1)

5-Aminopentanol (10 g, 98 mmol) and 50 mL of dehydrated dichloromethane were put in a 300-mL two-neck flask, followed by stirring in an ice bath. Then, 22.5 g (23.6 mL, 103 mmol) of di-t-butyl dicarbonate dissolved in 50 mL of dehydrated dichloromethane was gradually dropwise added into the flask using a dropping funnel. After the completion of the addition, the temperature was increased to room temperature, followed by stirring for 18 hours. After the completion of the reaction, the solvent was removed. The residue was dissolved in 100 mL of chloroform, followed by washing with 50 mL of 5% sodium hydrogen carbonate three times, 50 mL of pure water once, and 50 mL of saturated brine once. The organic layer was dried over magnesium sulfate, and the solvent was distilled off to quantitatively give 19.9 g of 5-(Boc-amino)-1-pentanol (1).

Synthesis of 5'-(Boc-aminopentyl) 2-bromo-2-methylpropionate (2)

The above prepared 5-(Boc-amino)-1-pentanol (1) (15 g, 73.8 mmol), 11.1 g (15.3 mL, 109.7 mmol) of triethylamine, and 50 mL of dehydrated THF were put in a 500-mL two-neck flask, followed by stirring in an ice bath. Then, 20.3 g (10.9 ml, 88.3 mmol) of 2-bromoisobutyl bromide dissolved in 50 mL of dehydrated THF was gradually dropwise added into the flask using a dropping funnel. After the completion of the addition, the temperature was increased to room temperature, followed by stirring for 18 hours. After the completion of the reaction, the solvent was removed. The residue was dissolved in 100 mL of chloroform, followed by washing with 50 mL of 5% sodium hydrogen carbonate three times, 50 mL of pure water once, and 50 mL of saturated brine once. The organic layer was dried over magnesium sulfate, and the solvent was distilled off, followed by purification by silica gel chromatography (silica gel 60N, manufactured by Wako Pure Chemical Industries, Ltd., spherical shape, neutral, Φ:4.5×15 cm, elution with ethyl acetate:hexane=1:4) to give 22.7 g of 5'-(Boc-aminopentyl) 2-bromo-2-methylpropionate (2) (yield: 87%).

Synthesis of 5'-aminopentyl 2-bromo-2-methylpropionate (3)

The above prepared 5'-(Boc-aminopentyl) 2-bromo-2-methylpropionate (2) (20 g, 56.8 mmol) and 100 mL of dichloromethane were put in a 200-mL round-bottom flask, followed by stirring at room temperature. Then, 7.4 g (64.9 mmol) of trifluoroacetic acid was added into the flask, followed by stirring at room temperature for 18 hours. The solvent was distilled off to quantitatively give 14.3 g of 5'-aminopentyl 2-bromo-2-methylpropionate (3).

Synthesis of 1,7-dibromoperylene-3,4,9,10-tetracarboxylic acid anhydride (4)

Perylene-3,4,9,10-tetracarboxylic acid anhydride (8.7 g, 22.2 mmol) and 130 mL of sulfuric acid were put in a 500-mL three-neck flask, followed by stirring at 55° C. for 24 hours. After 24 hours, 187 mg (0.74 mmol) of iodine was added in the flask, followed by further stirring for 5 hours. Subsequently, 8.1 g (2.6 ml, 54.4 mmol) of bromine was dropwise added thereto, followed by stirring at a reaction temperature of 85° C. for 24 hours. After the completion of the reaction, 40 mL of pure water was added thereto for precipitating the product, followed by filtration to collect 11.1 g (20.2 mmol) of 1,7-dibromoperylene-3,4,9,10-tetracarboxylic acid anhydride as a red solid (yield: 91%).

Synthesis of bis-1,7-(4-t-octylphenoxy)perylene-3,4,9,10-tetracarboxylic acid anhydride (5)

The above prepared 1,7-Dibromoperylene-3,4,9,10-tetracarboxylic acid anhydride (4) (8.0 g, 14.5 mmol), 11.6 g (56.2 mmol) of 4-t-octylphenol, 3.9 g (28.2 mmol) of potassium carbonate, and 540 mL of dimethylformamide were put in a 1000-mL round-bottom flask, followed by stirring under an argon atmosphere at 80° C. for 18 hours. After the completion of the reaction, 54 mL of acetic acid was added thereto, followed by further stirring for precipitation. The precipitate was collected by filtration, washed with methanol, and then dried in a vacuum to give 6.39 g (7.98 mmol) of bis-1,7-(4-t-octylphenoxy)perylene-3,4,9,10-tetracarboxylic acid anhydride (5) as a reddish violet solid (yield: 55%).

Synthesis of N-(5-(2-bromo-2-methylethylcarbonyloxy)pentyl)-bis(1,7-t-octylphenoxy)perylene-3,4-dicarboxyimide-9,10-dicarboxylic acid anhydride (6)

1,7-(4-t-Octylphenoxy)perylene-3,4,9,10-tetracarboxylic acid anhydride (5) (1.36 g, 1.76 mmol), 1.32 g (19.4 mmol) of imidazole, and 250 mL of chloroform were put in a 500-mL three-neck flask, followed by stirring while heating in an oil bath at 80° C. After the reaching of temperature, 0.97 g (1.76 mmol) of 5'-aminopentyl 2-bromo-2-methylpropionate (3) prepared as in above dissolved in 10 mL of chloroform was gradually added thereto. Furthermore, a small amount of trifluoroacetic acid was added thereto, followed by a reaction for 3 days. After the completion of the reaction, the reaction solution was cooled to room temperature, and 80 mL of acetic acid was added thereto, followed by stirring for 30 minutes. The reaction solution was subjected to liquid-liquid separation with water three times and saturated brine once. The resulting organic phase was dried over potassium carbonate. The solution was filtrated, and the solvent was distilled off. The resulting residue was purified by silica gel flash chromatography (silica gel 60N, manufactured by Wako Pure Chemical Industries, Ltd., spherical shape, neutral, Φ:9×25 cm, elution with chloroform) to give 96 mg (0.092 mmol) of N-(5-(2-bromo-2-methylethylcarbonyloxy)pentyl)-bis(1,7-t-octylphenoxy)perylene-3,4-dicarboxyimide-9,10-dicarboxylic acid anhydride (6) as a red solid (yield: 5.2%).

Synthesis of Initiator (PEO$_{114}$-pery-BMP)

N-(5-(2-Bromo-2-methylethylcarbonyloxy)pentyl)-bis(1,7-t-octylphenoxy)perylene-3,4-dicarboxyimide-9,10-dicarboxylic acid anhydride (96 mg, 0.092 mmol), 485 mg (7.13 mmol) of imidazole, 558 mg (0.11 mmol) of PEO$_{114}$—NH$_2$, 15 mL of chloroform, and 7.4 mL of N,N-dimethylacetamide were added to a 50-mL round-bottom flask, followed by stirring in an oil bath at 100° C. for 48 hours. The solvent was distilled off, and the residue was dissolved in 50 mL of chloroform, followed by washing with 100 mL of water twice and 100 mL of saturated brine once. The resulting organic layer was dried over magnesium sulfate, and the solvent was distilled off. The resulting solid was purified by preparative chromatography (JAIGEL-3HA 501202, 501204, manufactured by Japan Analytical Industry Co., Ltd., elution with chloroform) to give 485 mg (0.079 mmol) of a red initiator (yield: 86%).

Figure 3:
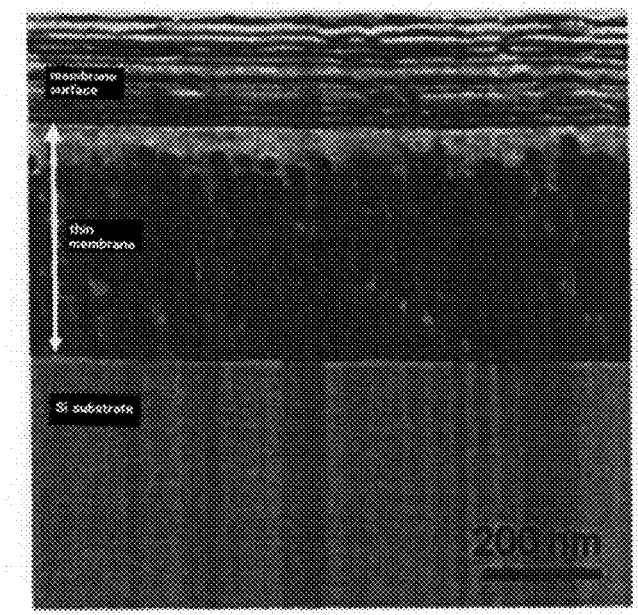
FIG. 3 is a transmission electron microscope photograph for observing a membrane cross-section of the resulting microphase-separated structure membrane.

Then, a copolymer was produced according to the following chart.

pery-b-PMA(Az)$_{50}$, onto a silicon substrate by bar coating was cleaved, and the cross-section thereof was observed by an atomic force microscope (AFM) to confirm a cylinder structure passing through the membrane cross-section, as shown in FIG. 3.

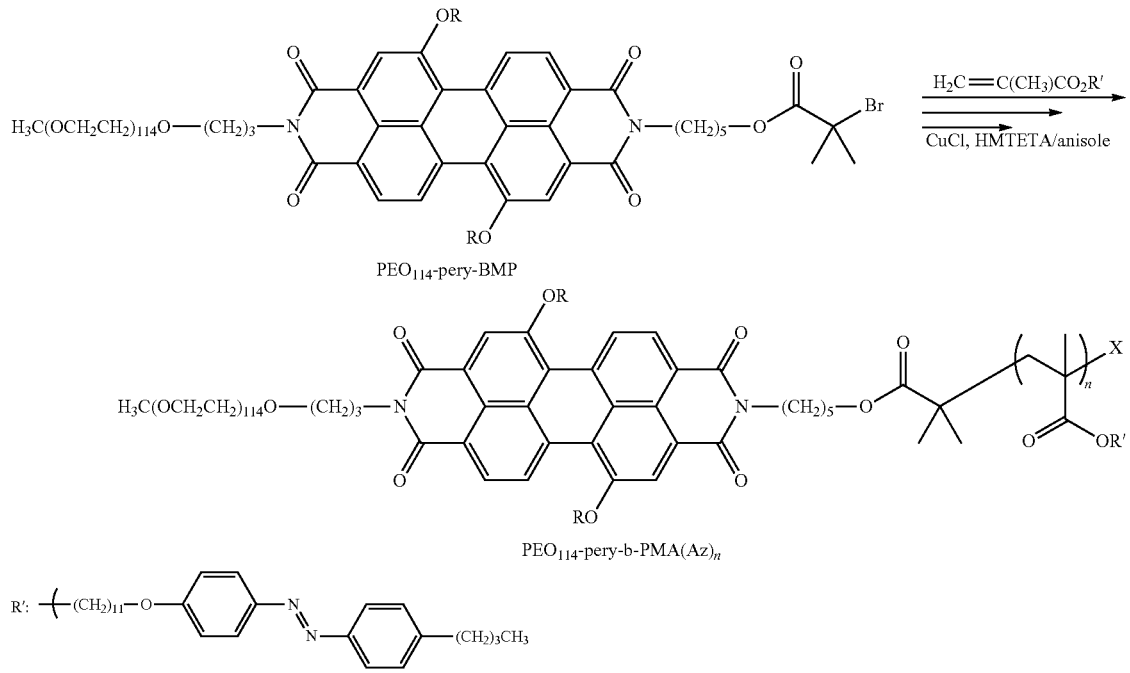

The initiator (PEO$_{114}$-pery-BMP) and a liquid-crystalline monomer (MA(Az)) were dissolved in freeze degassed anisole, and a complex prepared from copper chloride (I) and N,N,N,N-heptamethyltriethylenetetramine (HMTETA) was added thereto, followed by stirring with heating at 80° C. under argon for one day. After the completion of the reaction, the reaction solution was cooled to room temperature and was exposed to the air for terminating the reaction. The reaction solution was applied to basic alumina (manufactured by MERCK, elution with chloroform) short column chromatography to remove the complex. The solvent in the eluate was distilled off, and the residue was dissolved in a small amount of chloroform, followed by purification by reprecipitation in methanol. As a result, a block copolymer having a molecular weight distribution Mw/Mn of 1.15 and a degree of polymerization n of 50 was obtained.

Then, a thin membrane was formed as follows.

Figure 2:
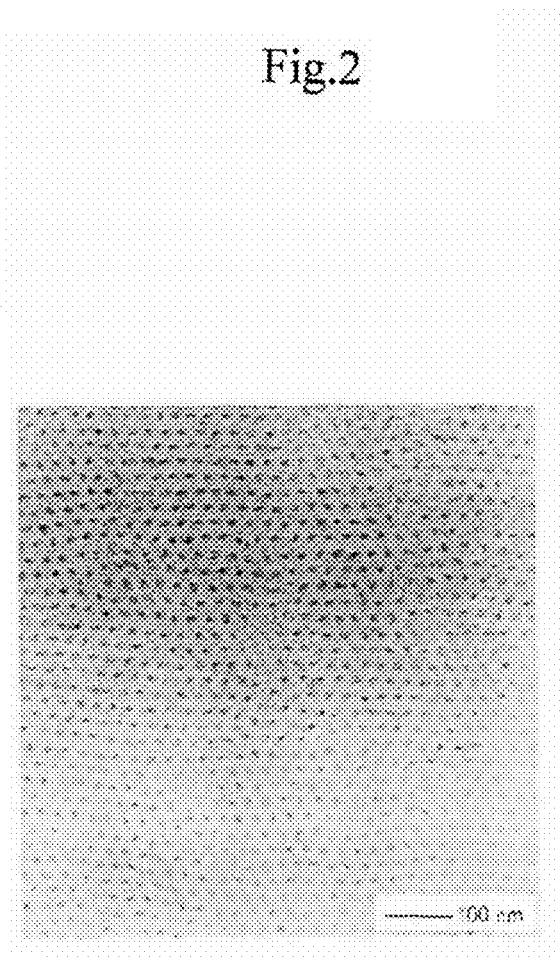
FIG. 2 is a transmission electron microscope photograph for observing a membrane direction of the resulting microphase-separated structure membrane.

A chloroform solution containing 2% by weight of the resulting block copolymer PEO$_{114}$-pery-b-PMA (Az)$_{50}$ was prepared and was applied onto a silicon substrate by spin coating to form a thin film. The film was peeled from the substrate on a water surface and was skimmed and transferred to a copper grid, followed by heating at 140° C. under vacuum. Then, the PEO domain was selectively stained with ruthenium tetroxide and was observed by a transmission electron microscope (TEM). The results are shown in FIG. 2. As shown in FIG. 2, a hexagonal dot pattern was observed in the resulting microphase-separated structure membrane. Furthermore, a sample formed by applying a chloroform solution containing 2% by weight of the block copolymer, PEO$_{114}$-

The invention claimed is:

1. A microphase-separated structure membrane comprising a block copolymer in which a hydrophilic polymer component and a hydrophobic polymer component are coupled to each other via a structural unit having a reactive group, wherein
the hydrophilic polymer component is poly(ethylene oxide),
the hydrophobic polymer component is poly(acrylate) or poly(methacrylate) having a mesogenic side chain;
a cylinder structure composed of the hydrophilic polymer component lies in a matrix composed of the hydrophobic polymer component and said cylinder structure is oriented in the direction perpendicular to the membrane surface, and the structural unit having a reactive group lies between the matrix and the cylinder structure; and
the structural unit having a reactive group is represented by any of the following formulae (5)-(12) and (14)-(32):

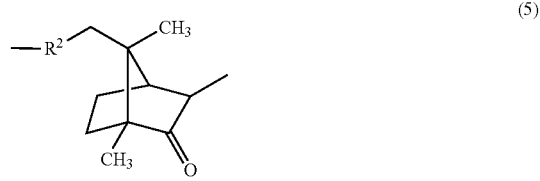

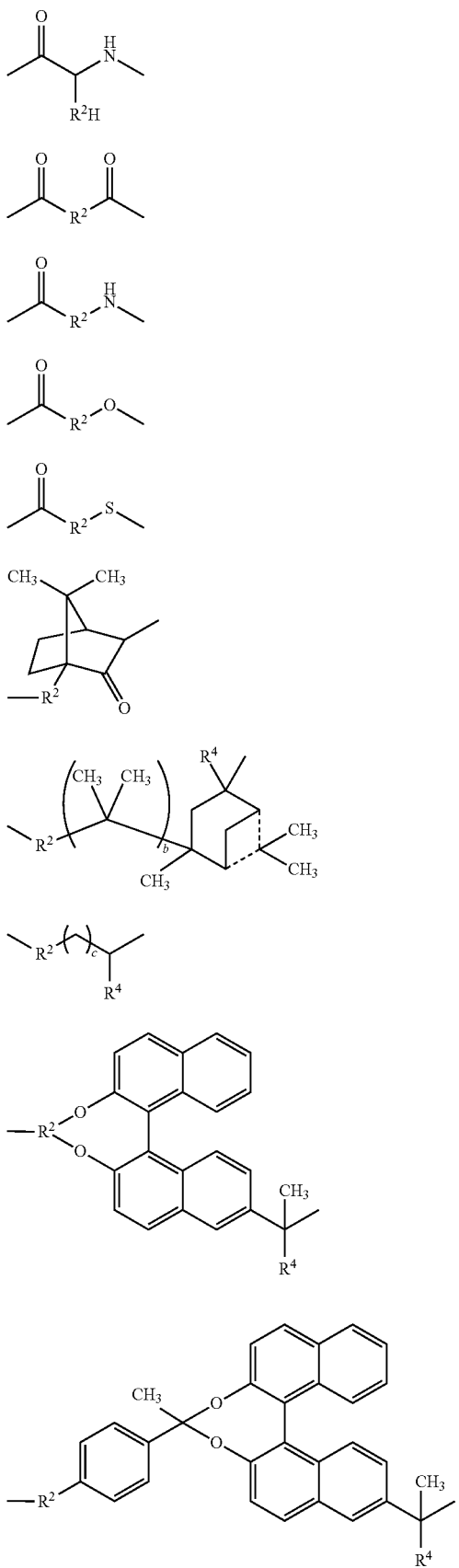
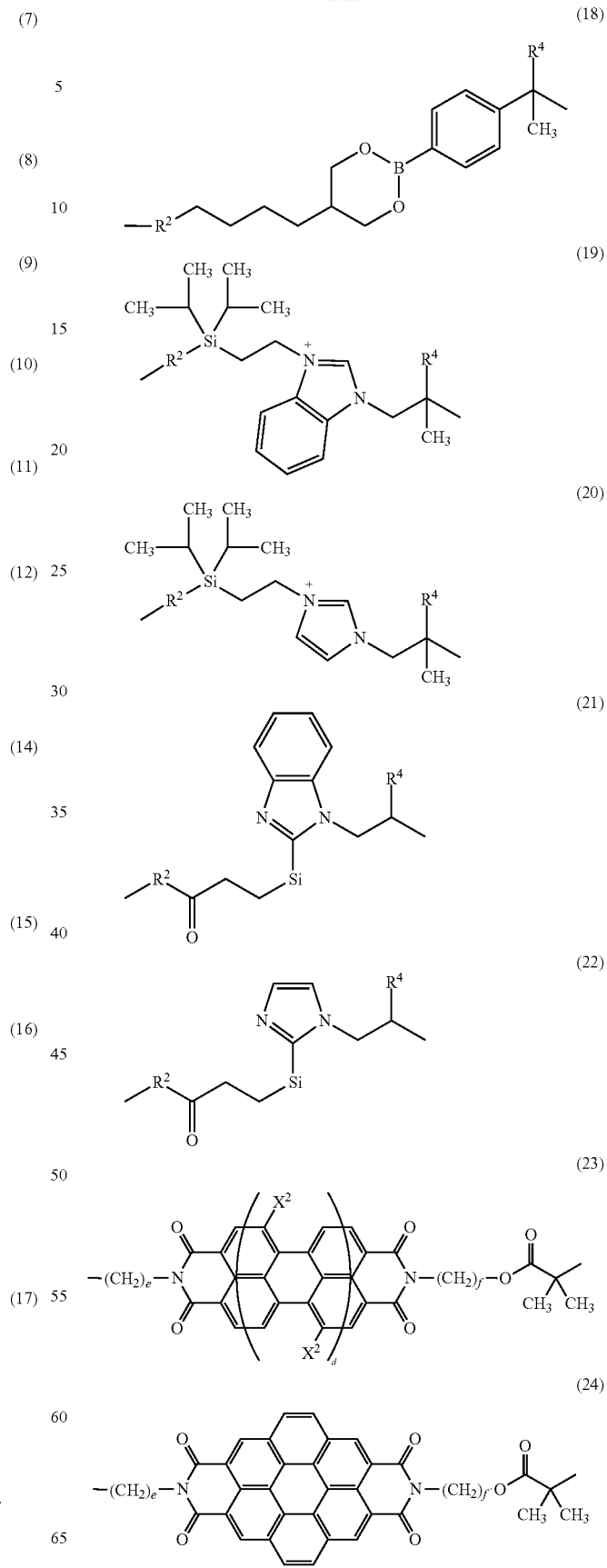

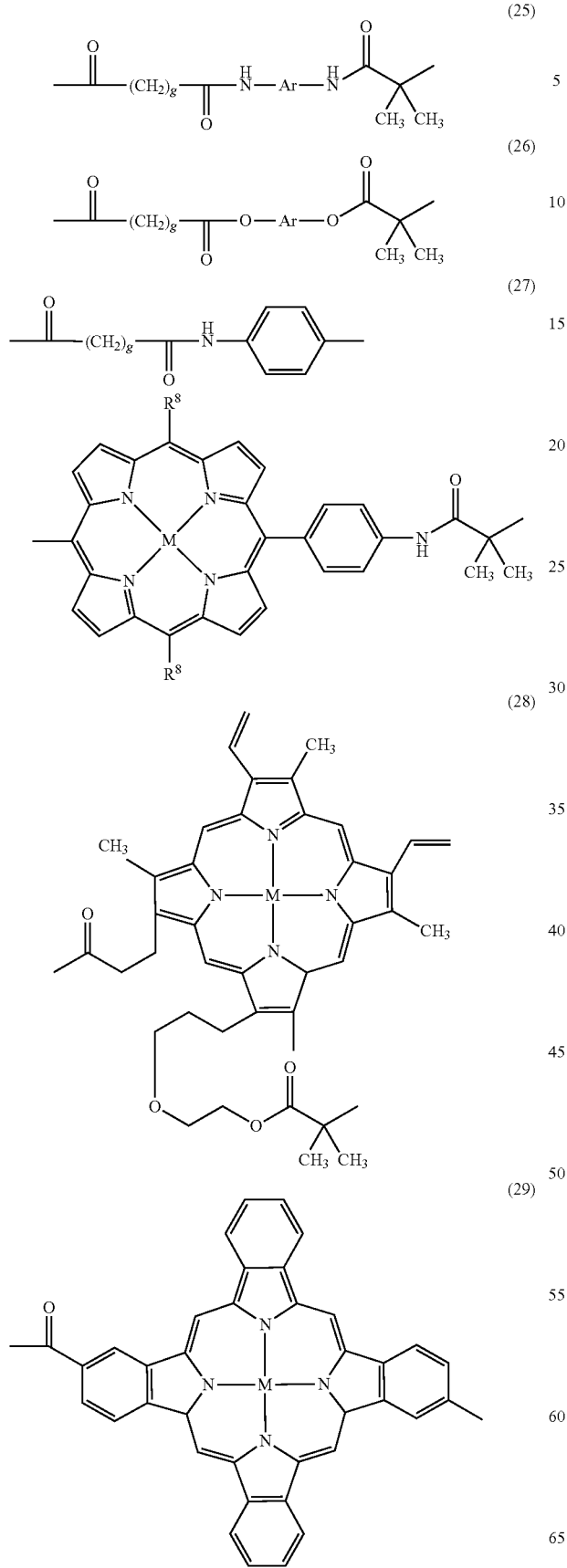
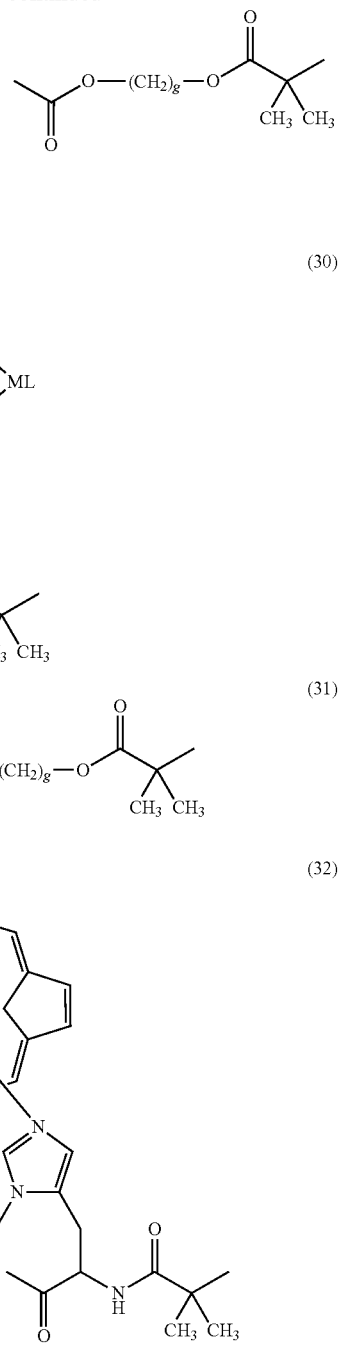

(in the formulae, $R^2$ represents a reactive group; $R^4$ represents a cyano group or a carboxylic acid ester; Fu represents a fullerene; b and c may be the same or different and each represent an integer of 0 to 4; d represents an integer of 0 to 3; e, f, and g may be the same or different and each represent an integer of 1 to 10; Ar represents an aromatic hydrocarbon composed of a plurality of aromatic rings or a quinone; $R^8$ represents hydrogen, an aromatic hydrocarbon, or a heterocycle; M represents $H_2$ or a metal ion; ML represents a transition metal complex; Por represents a porphyrin; and $X^2$ represents hydrogen, a halogen, or a phenoxy group having an alkyl group, wherein the reactive group is selected from the group consisting of the followings:

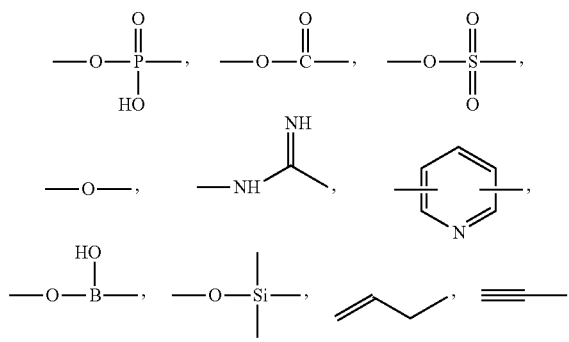

in the formulae, R³ represents a hydrogen atom or an alkyl group)).

2. The microphase-separated structure membrane according to claim 1, wherein the molecular weight distribution (Mw/Mn) of the copolymer is 1.4 or less.

3. The microphase-separated structure membrane according to claim 1, wherein the copolymer is represented by the following formula (1):

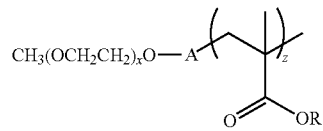
(1)

(in the formula, x and z may be the same or different and each represent an integer of 5 to 500; A is a reactive group represented by any of the formulae (5) to (32) below; and R is a substituent represented by the following formula (2), (3), or (4):

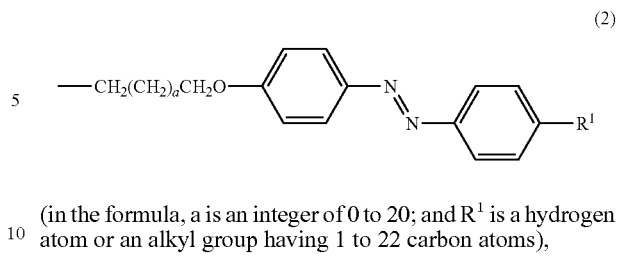
(2)

(in the formula, a is an integer of 0 to 20; and $R^1$ is a hydrogen atom or an alkyl group having 1 to 22 carbon atoms),

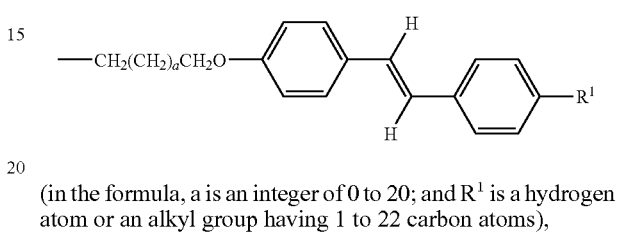
(3)

(in the formula, a is an integer of 0 to 20; and $R^1$ is a hydrogen atom or an alkyl group having 1 to 22 carbon atoms),

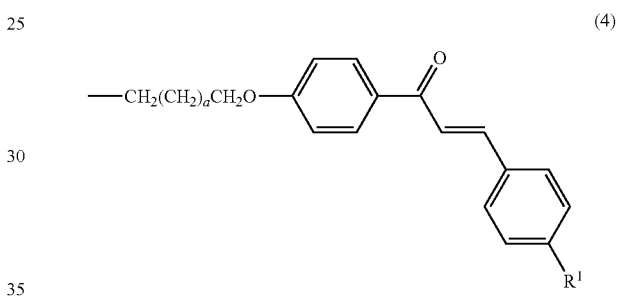
(4)

(in the formula, a is an integer of 0 to 20; and $R^1$ is a hydrogen atom or an alkyl group having 1 to 22 carbon atoms),

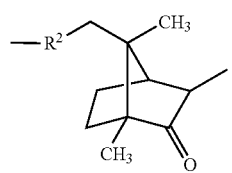
(5)

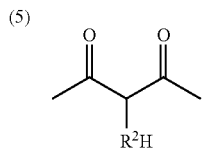
(6)

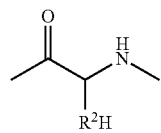
(7)

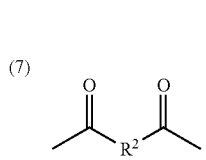
(8)

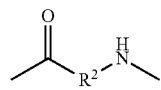
(9)

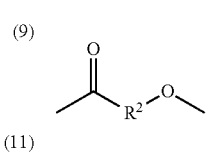
(10)

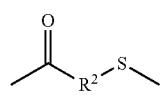
(11)

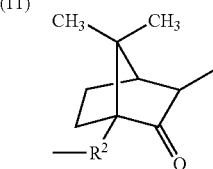
(12)

-continued
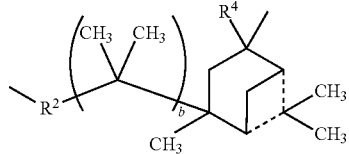
(14)
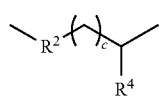
(15)
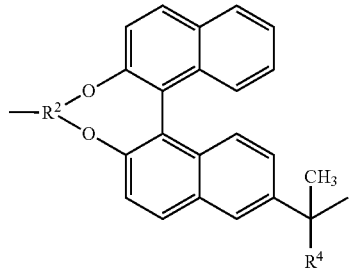
(16)
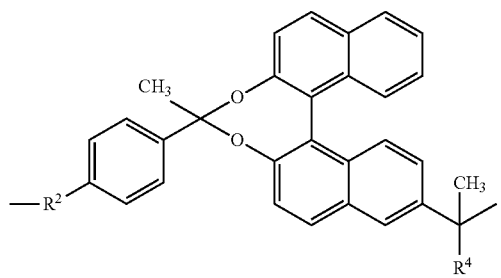
(17)
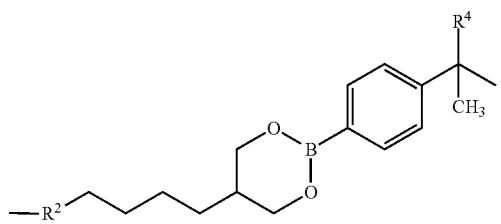
(18)
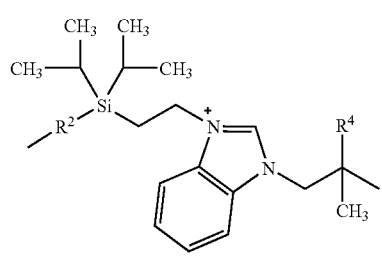
(19)
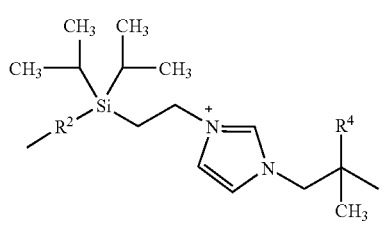
(20)
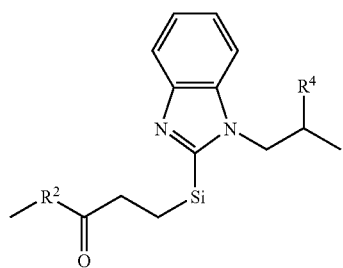
(21)
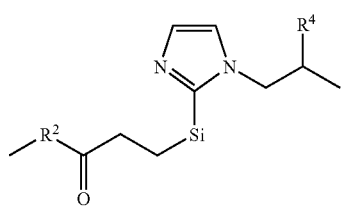
(22)
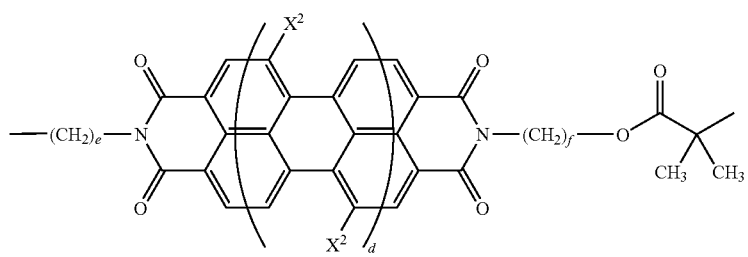
(23)

(24)
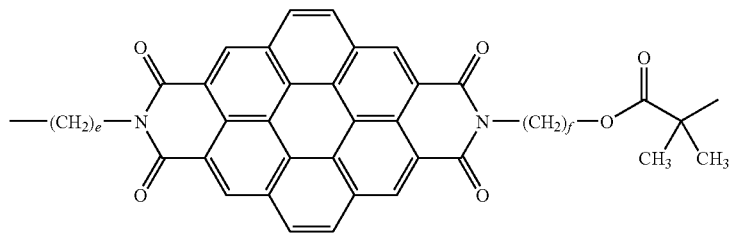
(25)
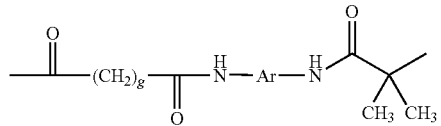
(26)
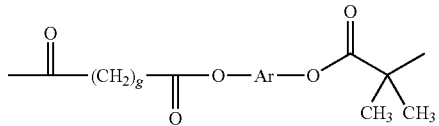
(27)
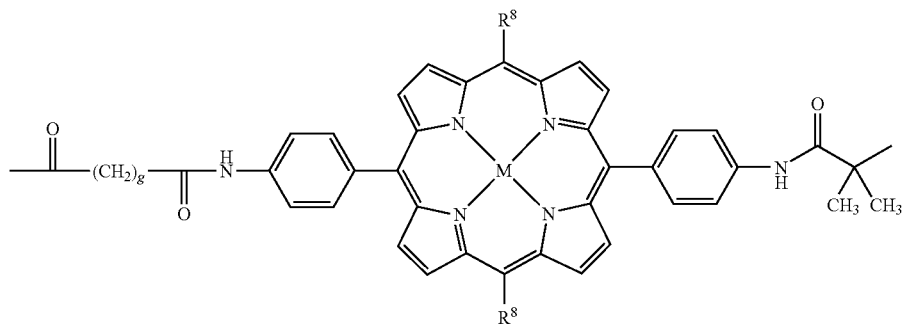
(28)
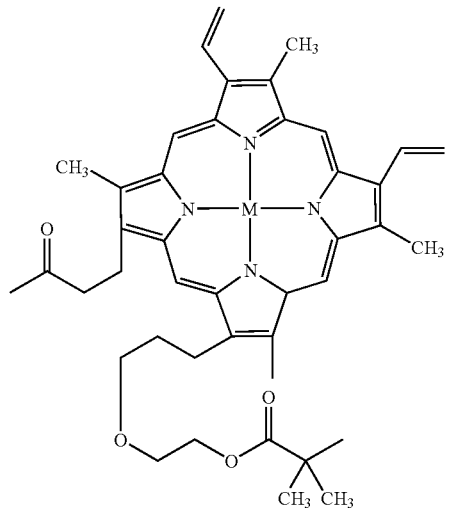
(29)
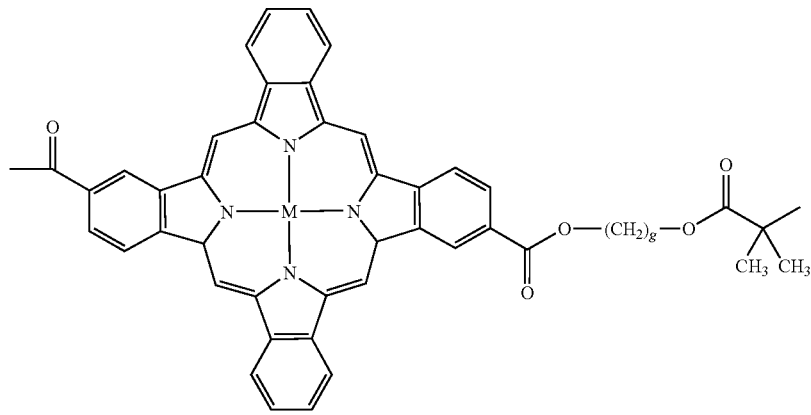

-continued

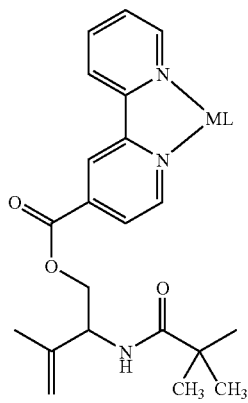
(30)

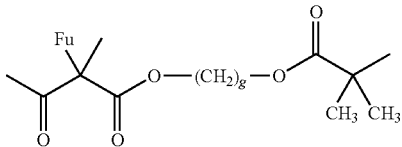
(31)

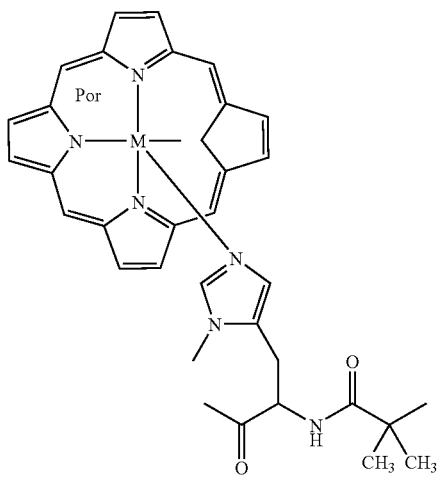

(in the formulae, $R^2$ represents a reactive group; $R^4$ represents a cyano group or a carboxylic acid ester; Fu represents a fullerene; b and c may be the same or different and each represent an integer of 0 to 4; d represents an integer of 0 to 3; e, f, and g may be the same or different and each represent an integer of 1 to 10; Ar represents an aromatic hydrocarbon composed of a plurality of aromatic rings or a quinone; $R^8$ represents hydrogen, an aromatic hydrocarbon, or a heterocycle; M represents $H_2$ or a metal ion; ML represents a transition metal complex; Por represents a porphyrin; and $X^2$ represents hydrogen, a halogen, or a phenoxy group having an alkyl group, wherein the reactive group is selected from the group consisting of the followings:

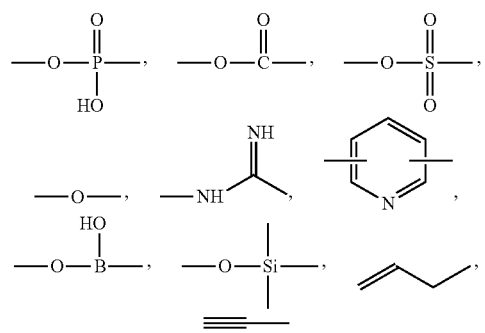

in the formulae, $R^3$ represents a hydrogen atom or an alkyl group).

4. The microphase-separated structure membrane according to claim 1, wherein the reactive group is selected from the group consisting of the followings:

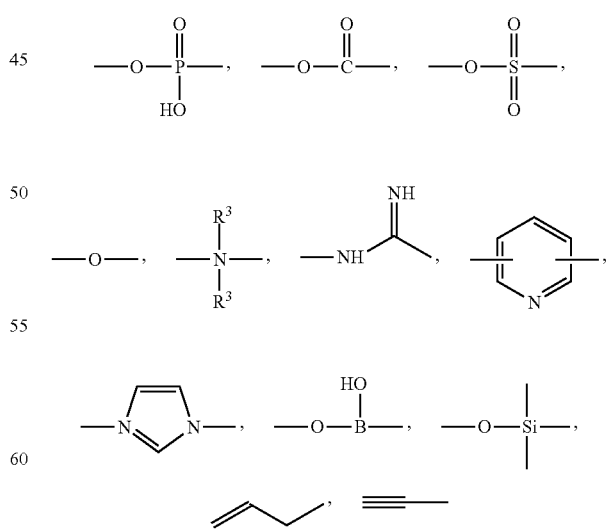

(in the formulae, $R^3$ represents a hydrogen atom or an alkyl group).

5. The microphase-separated structure membrane according to claim 1, wherein the cylinder structure is a hexagonal close-packed cylinder structure.

6. The microphase-separated structure membrane according to claim 1, wherein the membrane is disposed on a substrate.

* * * * *